United States Patent

Badalament et al.

[11] Patent Number: 6,012,384
[45] Date of Patent: Jan. 11, 2000

[54] MOBILE RIPENING CONTAINER

[75] Inventors: Mark A. Badalament, Rochester; Daniel S. Harmsen, Southgate, both of Mich.

[73] Assignee: Trans Tech Holdings Group, Bloomfield Hills, Mich.

[21] Appl. No.: 09/303,302

[22] Filed: Apr. 30, 1999

Related U.S. Application Data

[60] Provisional application No. 60/083,993, May 1, 1998, provisional application No. 60/093,909, Jul. 23, 1998, and provisional application No. 60/103,540, Oct. 8, 1998.

[51] Int. Cl.[7] .............................. A23B 7/00; A23B 7/144; A23L 1/00; A23L 3/00
[52] U.S. Cl. ................................. 99/475; 62/78; 62/329; 99/467; 99/476; 99/517
[58] Field of Search .............................. 99/352–355, 467, 99/468, 472, 473–476, 477, 484, 485, 516, 534, 517; 34/192, 194, 196, 222, 231; 62/329, 78, 89, 381, 408, 239, 179, 414, 419, 127, 141, 303, 374, 384; 165/65; 312/116, 236; 422/28, 40, 292; 426/316–320, 395, 419, 263

[56] References Cited

U.S. PATENT DOCUMENTS

| | | | |
|---|---|---|---|
| 4,879,877 | 11/1989 | Hicke ..................................... | 62/329 X |
| 4,894,997 | 1/1990 | Urushizaki et al. .................... | 99/468 X |
| 5,318,789 | 6/1994 | Nakagawa et al. ...................... | 426/316 |
| 5,373,780 | 12/1994 | Bianco .................................... | 99/475 |
| 5,419,153 | 5/1995 | Hartley ................................... | 99/468 X |
| 5,457,963 | 10/1995 | Cahill-O'Brien et al. ............ | 422/40 X |
| 5,566,608 | 10/1996 | Vejdani et al. ......................... | 99/475 X |
| 5,623,105 | 4/1997 | Liston et al. ............................. | 62/78 |
| 5,660,057 | 8/1997 | Tyree et al. ............................... | 62/384 |
| 5,715,685 | 2/1998 | Takasugi .................................. | 62/239 X |
| 5,778,557 | 7/1998 | Leavens ................................... | 99/474 |
| 5,789,007 | 8/1998 | Bianco .................................... | 99/468 X |
| 5,801,317 | 9/1998 | Liston et al. ............................. | 99/468 |

Primary Examiner—Timothy Simone
Attorney, Agent, or Firm—Bliss McGlynn, P.C.

[57] ABSTRACT

A mobile container adapted for transporting perishable goods includes a front wall, a rear wall, a pair of side walls extending therebetween so as to define an elongated enclosure having a longitudinal axis and adapted to receive a cargo load. An air recirculation plenum is defined in the enclosure adjacent to the front wall. A refrigeration system is in fluid communication with the air recirculation plenum and is adapted to induct air at a first temperature and to exhaust air at a second temperature. A pair of air delivery plenums extend from the bulkhead along the length of the enclosure parallel to the longitudinal axis. Each of the pair of air delivery plenums is defined by a corresponding one of the pair of side walls and a plenum wall disposed spaced from the corresponding side wall and extending from the upper margins of the enclosure such that the plenum wall is adapted to be co-extensive and in abutting contact with a portion of the cargo load. The container also includes a source of pressurized air having an inlet in fluid communication with the exhausted air from the refrigeration system and an outlet in fluid communication with the pair of air delivery plenums. A return air plenum is defined between the air delivery plenums such that the cool air is supplied under pressure along the longitudinal length of the enclosure parallel to and adjacent the pair of side walls and then flows through the cargo load in a direction substantially transverse to the longitudinal axis into the return air plenum whereafter the air flows substantially parallel to the longitudinal axis back to the air recirculation plenum.

28 Claims, 11 Drawing Sheets

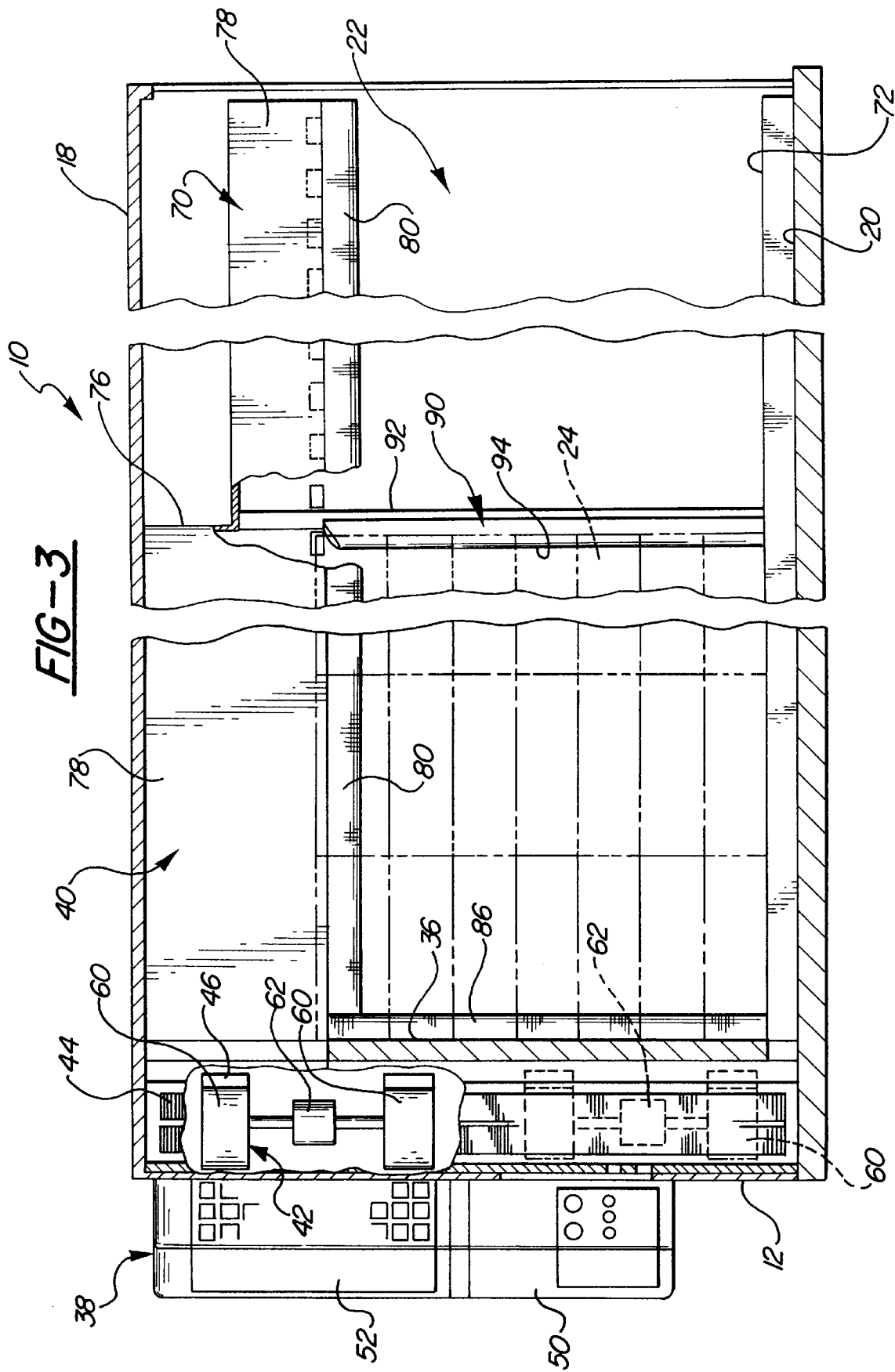

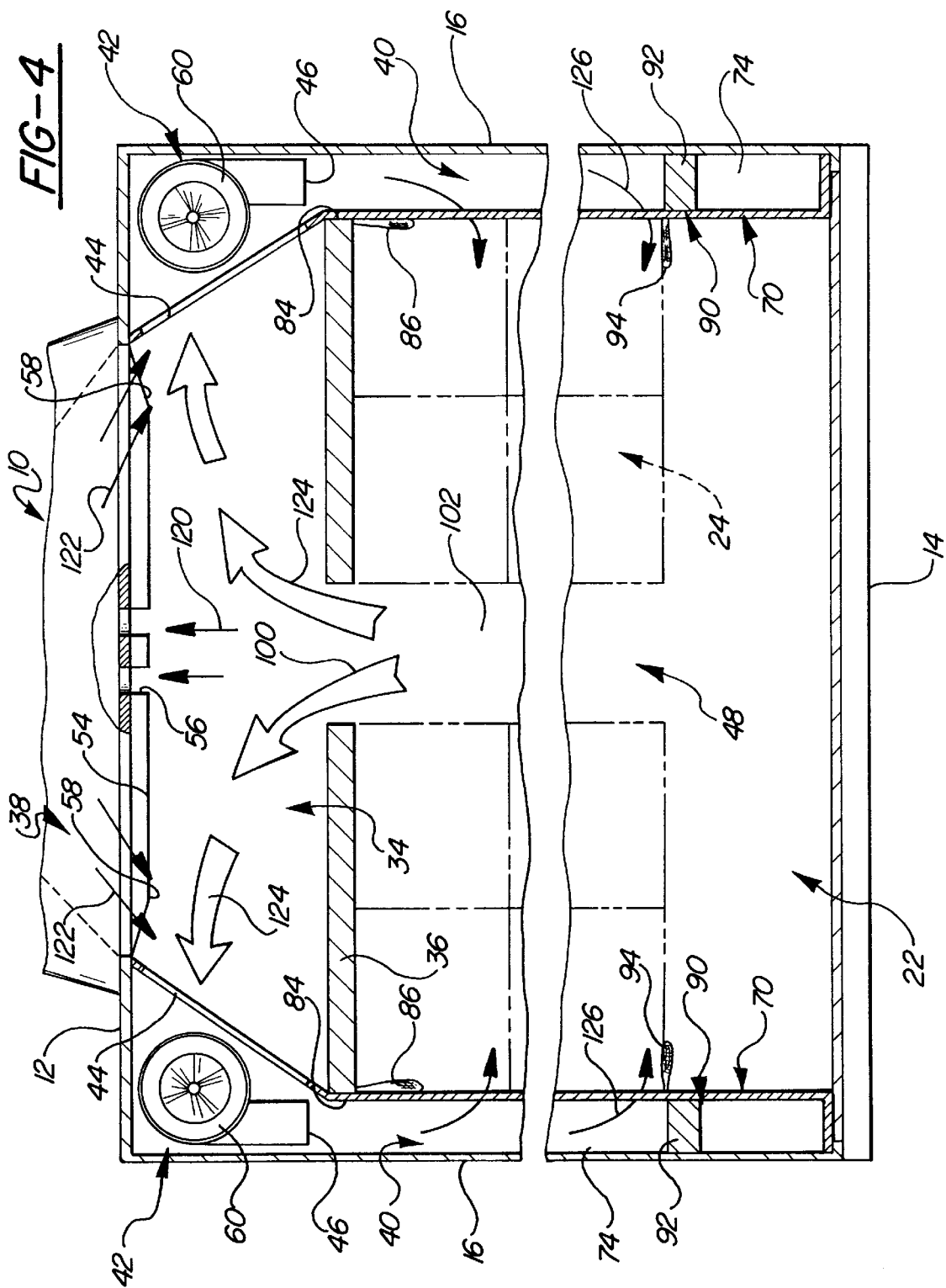

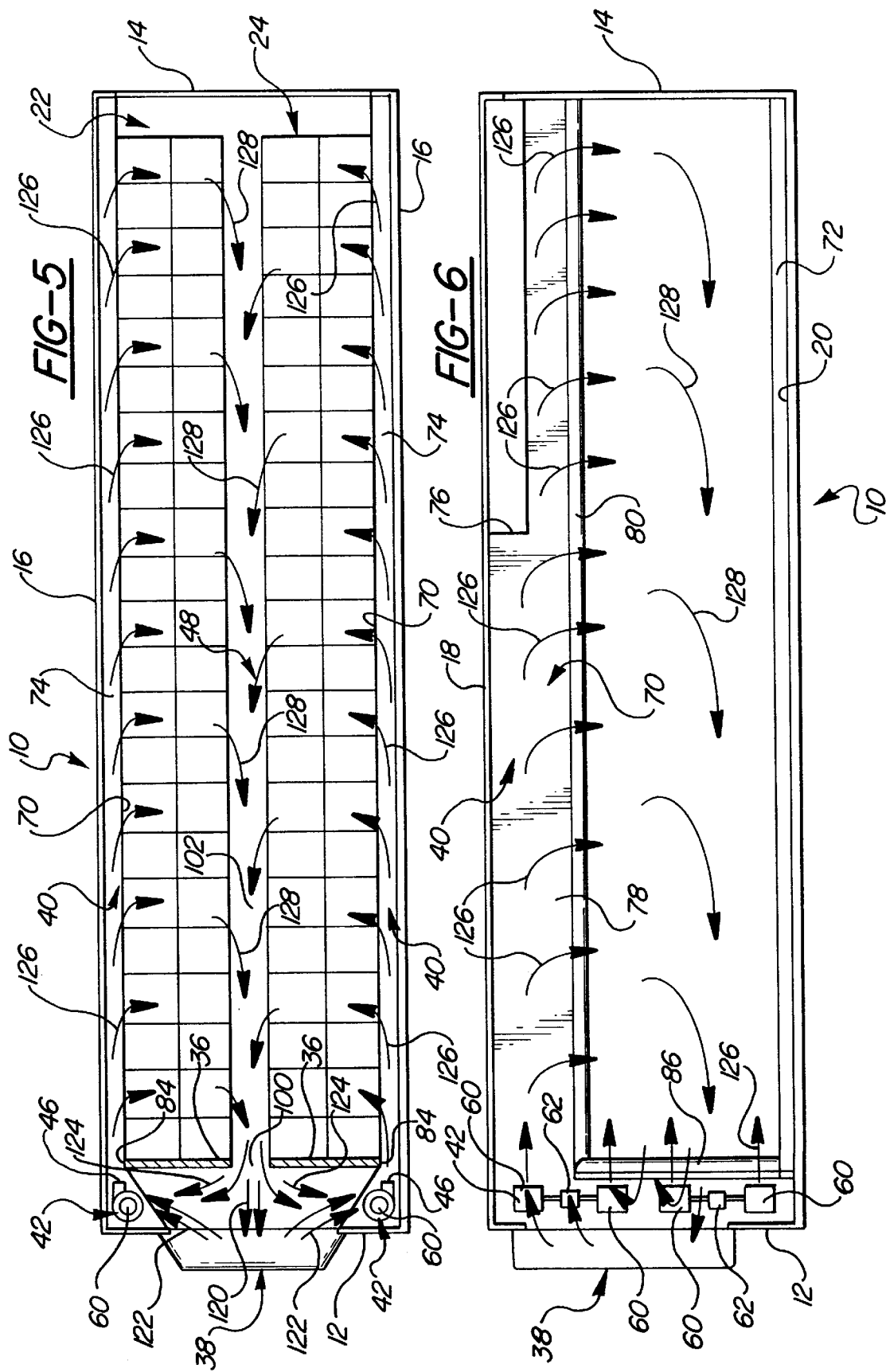

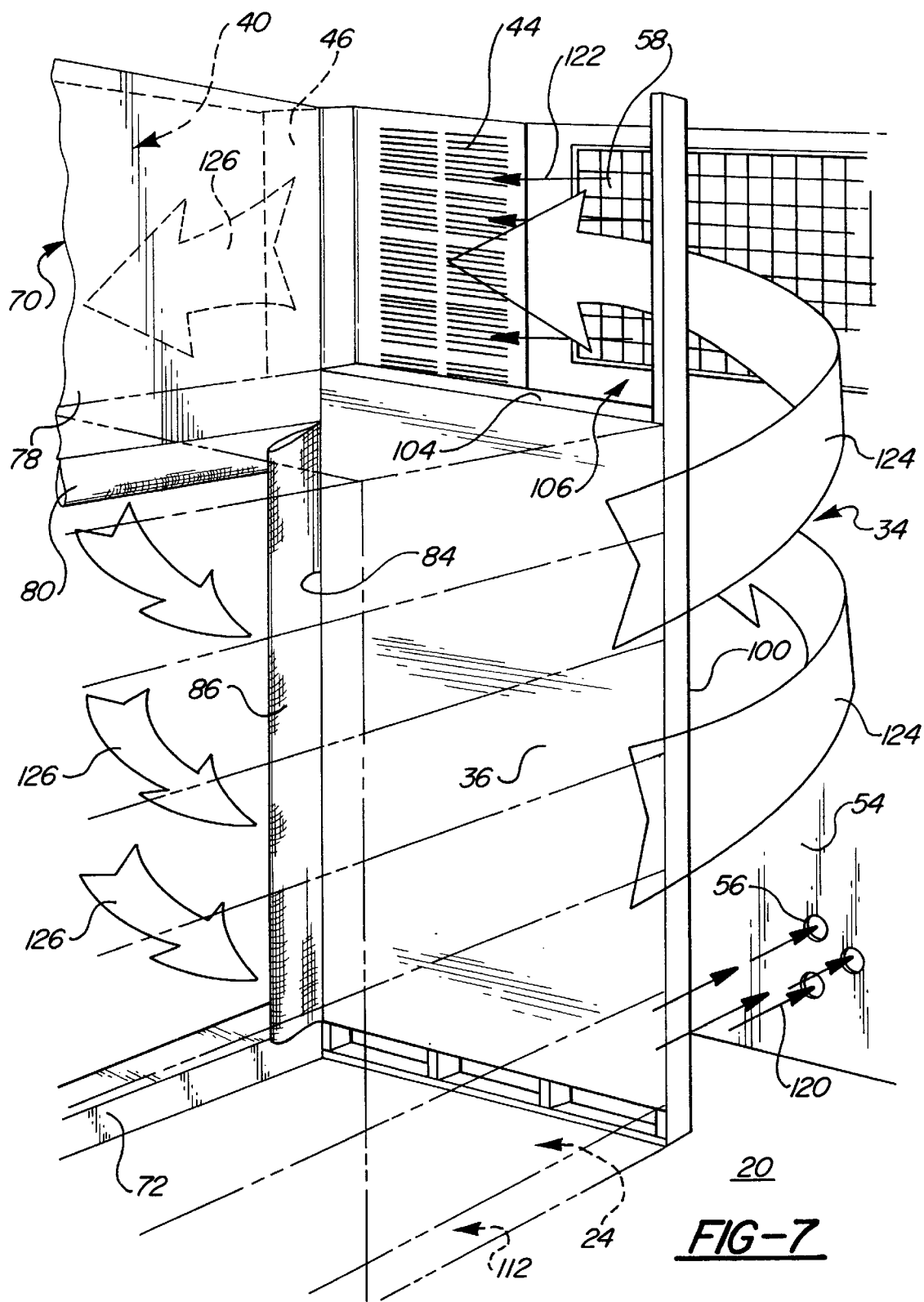

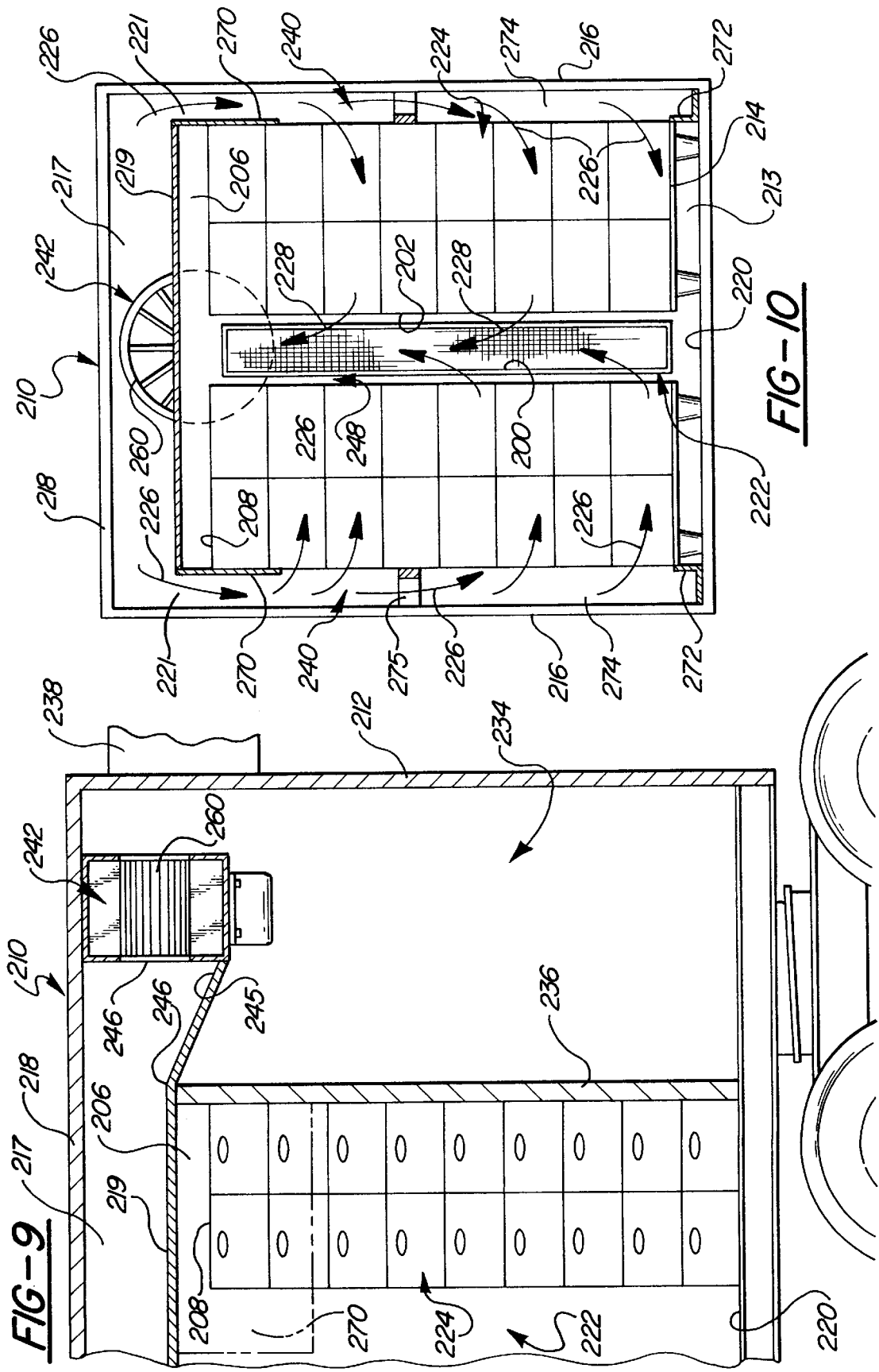

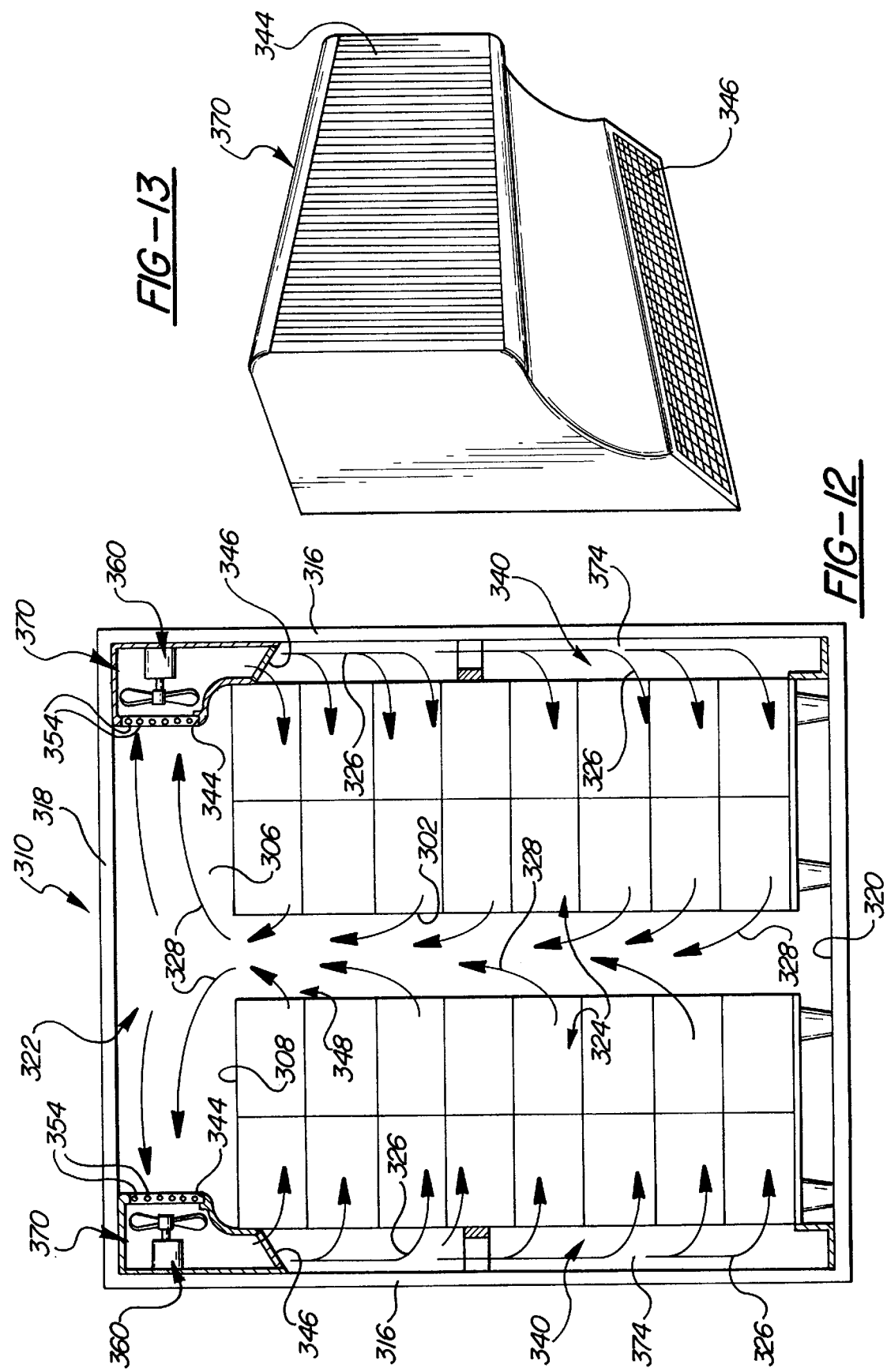

MOBILE RIPENING CONTAINER

This application claims the benefit of U.S. Provisional Application No. 60/083,993, filed May 1, 1998; U.S. Provisional Application No. 60/093,909, filed Jul. 23, 1998; and U.S. Provisional Application No. 60/103,540, filed Oct. 8, 1998.

BACKGROUND OF THE INVENTION

1. Field of the Invention

The present invention is directed, generally, toward shipping and handling of perishable goods. More specifically, the present invention is directed toward a mobile container which facilitates the economic shipping and ripening of perishable goods such as produce, including fruits and vegetables, and especially such perishable goods which may become climacteric as they undergo an exothermic ripening process.

2. Description of the Related Art

Refrigerated vehicles have long been employed in a wide variety of applications including the storing and marketing of perishable commodities, particularly produce such as fruits and vegetables, as well as other perishable foods including processed and frozen or chilled products such as ice cream, yeast, etc. The refrigerated vehicles contemplated by the present invention include, for example, truck trailers for road transport and piggy-back use, railroad cars and container bodies contemplated for land and sea service, and the like. Accordingly, all refrigerated containers of the type referred to above are included within the present invention under the general designation of refrigerated containers or vehicles adapted to receive cargo in a refrigerated space.

Shipping and handling of produce which undergo an exothermic ripening process presents certain problems which must be effectively addressed to avoid spoiling the produce. For example, this exothermic ripening process can generate a considerable amount of heat. The temperature of the produce must be accurately controlled to control the ripening process or to delay the ripening process until the produce may be brought to or near the ultimate consumer. Such accurate control of the produce prevents uneven ripening, premature spoilage and other problems. Produce of this type may include fruits such as bananas, tomatoes, avocados, melons, pears, honeydews, and the like.

More specifically, it has long been known that ripening bananas give off or produce a tremendous amount of heat. Thus, the shipping and handling of bananas has been the subject of considerable study directed toward the problem of prohibiting the onset of the ripening process during shipping, controlling the ripening process once it has begun and the delivery of semi-ripened or ripened bananas to retail outlets such as grocery stores and the like with a minimum amount of spoilage. The onset of the ripening process for bananas is a function of temperature. Once the ripening process has begun, the speed of this process is a function of time and temperature—both of which must be delicately balanced to produce favorable results. Other fruits and vegetables undergo similar exothermic ripening processes. However, since bananas enjoy particular popularity among the consuming public, not only in the United States but in a majority of the populated world, and because transporting bananas presents some of the most difficult problems in terms of controlling the ripening process, for purposes of the discussion that follows, it will be assumed that the produce in question are bananas. However, it will be appreciated that the present invention may be employed with other types of perishable goods.

Boxes of produce are sometimes transported from packing facilities to ships in non-air conditioned trucks or railroad cars. Alternatively, the fresh-picked produce may be immediately chilled to reduce the temperature of the goods in a container conventionally known in the art as a "precooler." This is done to preserve the quality and freshness of the fruit. Bananas are typically shipped from their country of origin packed in ventilated, corrugated cardboard boxes on pallets. The fruit is wrapped in plastic liners that have small openings throughout the plastic liners. The typical banana box, for instance, is 10" high, 16" wide and about 20" long and is stacked on a pallet eight boxes high with six boxes to a layer.

When the palletized fruit leaves the country of origin, it is usually loaded onto refrigerated ocean going ships. On the ships, the fruit is either containerized or "break bulked" and later off-loaded to mobile containers for overland transportation to warehouses or ripening facilities. This journey by ship can last anywhere from three to five days, depending on the country of origin. During this time, the bananas are held at a pulp temperature of 56° to 58°. At these temperatures, the bananas will not begin to ripen absent inducement by artificial means as will be discussed below. Upon discharge from a ship, the break bulked fruit or refrigerated containers may be transferred to trucks or chassis for delivery to ripening facilities, customers or processors. Alternatively, the fruit may be transferred from the containers into air conditioned trucks or air conditioned railroad cars for transportation to ripening facilities, customers, or processors. The temperature in the refrigerated trucks is typically set at 57° in the warm months of the year and 60° in the colder months. Due to extreme cold during the winter in some regions of the United States, the side walls and corners of the trailers run cooler. In harsh winter conditions, the bananas are susceptible to chill. Therefore, the refrigerated trucks are run warmer in the winter than in summer months. In the trucks and other similar containers, the conditioned air is Generally supplied from a unit at the front of the container and is blown across the top of the cargo to the back of the container. However, the air is not pressurized to any significant extent. Some trucks are provided with slotted floors which facilitate access of air to the bottom of the boxes.

At processing facilities, the banana boxes are placed in specially designed ripening rooms provided with insulated, gas tight walls and roof panels. The rooms are generally 30 to 40 feet long and 10 to 15 feet wide and have heights accommodating stacks of boxes in racks of two or three tiers or stacks of boxes in tiers without racks. Each room contains an air handling unit which cools or warms the air. Large fans are employed to circulate the air around the room under pressure. The temperature of the air in these ripening rooms is controlled in accordance with a ripening schedule, and ethylene gas is dispersed in the room at predetermined times to facilitate uniform ripening of the fruit. In the case of bananas, for example, the fruit is held in the ripening rooms for four or five days before the fruit is sufficiently ripe. When originally placed in the ripening rooms, not all hands in a box of bananas have the same maturity. Ethylene gas promotes even ripening in bananas at the lowest possible temperatures in a minimum amount of time. It enables all the fruit in one ripening room to turn out evenly. Ethylene is a natural by-product of bananas. The fruit may be gassed in a room for approximately 24 hours where it is exposed to ethylene at a rate of 100 to 300 parts per million. The gas is used to bring all of the fruit to the same 10 to 15 parts per million of ethylene. From the ripening room, the semi-ripened or ripe palletized fruit is then returned to a mobile, refrigerated trailer for transportation to another distribution center or retail outlet.

Ripening rooms are expensive to build and maintain. They are large and take up a considerable amount of space. In fact, ripening rooms are designed with a view toward the conventional wisdom that a large volume of free space in any ripening room is required in order to dissipate the heat emitted from the ripening fruit. They also have fixed capacities. Thus, any method or apparatus which can effectively shorten the time for ripening the fruit without sacrificing quality will increase the capacity of the ripening facility and thereby reduce costs and increase profits.

In the past, it has been suggested to employ the mobile trailer or shipping container for a portion of this ripening process. By starting the ripening process in the trailer or shipping container two or three days before the fruit reaches the ripening center, the processing time required in the larger ripening rooms may be reduced by half or more thus increasing productivity of the ripening facility. There are a number of devices which have been disclosed in the related art which, on their face, purport to accomplish this objective. However, none of the devices known in the related art have been implemented commercially to date because of certain problems which have heretofore been insurmountable.

The typical refrigerated mobile trailer or shipping container used to transport perishable goods is not adequate to handle the inherent temperature rise caused by the exothermic ripening process which bananas and other climacteric fruit undergo. More specifically, bananas go through a continuing process of respiration depending on maturity and pulp temperatures. They take in oxygen and give off carbon dioxide, ethylene gas and other volatile esters. Several changes occur during the respiration process. Starch converts to sugar and the hard pulp softens. The green chlorophyll of the peel is destroyed allowing the yellow carotene to show through. In addition, the bananas generate an extreme amount of heat. During this build up and particularly at maximum heat production, accurate pulp temperature control is essential. In short, the great heat output of the ripening process is more than any currently known refrigerated container in commercial use is capable of dissipating. In mobile trailers and shipping containers, the banana boxes are stacked close to the ceilings to preserve and maintain economical transportation costs. When the ripening process was initiated in such containers in the past, the temperature in the container would typically rise inordinately in an uncontrolled way such that the ripening process was escalated and ultimately led to the deterioration of the fruit. The heat generated by the exothermic ripening reaction is simply far beyond the capacity of the refrigeration and fan means on trailers or shipping containers conventionally used to deliver cooled air in sufficient quantities to uniformly absorb and reject the heat generated during this process. Attempts in the past to employ trailers modified to address this issue have resulted in limited cargo space which accommodates only small loads or have resulted in damaged fruit that is ultimately unsaleable. Thus, the modified containers proposed in the past are simply not economically viable and for the most part have not been employed to ripen fruit to any commercially recognizable extent.

In contrast, ripening rooms have a much larger volume than mobile shipping trailers as well as much higher cooling capacities. Thus, the ripening room is capable of handling the exothermic ripening reaction produced in climacteric fruit. Examples of ripening rooms conventionally known in the art include those disclosed in U.S. Pat. No. 5,531,158 issued to Perriman, Jr. on Jul. 2, 1996 for a produce ripening apparatus and method, as well as U.S. Pat. No. 5,566,608 issued to Vejdani et al. on Oct. 22, 1996 for a vertical flow ripening room. However, the physical structure, components and technology employed in ripening rooms to handle the heat generated during the banana ripening process is simply not compatible with mobile containers—especially those which are towable behind a truck over roads, highways and the like. Accordingly, the devices disclosed in the above-identified patents as well as similar, related art, are simply non-analogous to the present invention.

Thus, there remains a need in the art for a mobile refrigerated container with sufficient air flow and cooling capacity to adequately control the climacteric fruit during its exothermic ripening process. In addition, there is a need in the art for such a mobile container with an economically sufficient capacity for hauling the fruit so that shipping the fruit in this way remains cost-effective and competitive. Furthermore, there remains a need in the art for a mobile container of this type which is also suitable in size and capacity for shipping goods other than ripening fruit so that the trailer may be effectively employed during back hauls to the initial shipping point or anywhere else.

SUMMARY OF THE INVENTION AND ADVANTAGES

The present invention overcomes the disadvantages in the related art in a mobile container which is adapted for transporting perishable goods. The container of the present invention includes a front wall, a rear wall, a pair of side walls extending therebetween, a ceiling and a floor disposed spaced apart from one another by the front, rear and pair of side walls so as to define an elongated enclosure having a longitudinal axis and adapted to receive a cargo load. An air recirculation plenum is defined in the enclosure adjacent the front wall. The container also includes a refrigeration system in fluid communication with the air recirculation plenum and adapted to induct air at a first temperature and to exhaust the air at a second temperature. In addition, the container includes a pair of air delivery plenums extending from the air recirculation plenum along the length of the elongated enclosure parallel to its longitudinal axis. Each of the pair of air delivery plenums is defined by a corresponding one of the pair of side walls and a plenum wall which is disposed spaced from the corresponding side wall and which extends from the upper margins of the enclosure such that the plenum wall is adapted to be coextensive and in abutting contact with a portion of the cargo load. A source of pressurized air has an inlet in fluid communication with the exhausted air from the refrigeration system and an outlet in fluid communication with the pair of air delivery plenums. A return air plenum is defined between the pair of air delivery plenums such that the cool air is supplied under pressure along the longitudinal length of the enclosure parallel to and adjacent the pair of side walls and then flows through the cargo load in a direction substantially transverse to the longitudinal axis into the return air plenum whereafter the air flows substantially parallel to the longitudinal axis back to the air recirculation plenum.

As will become clear from the detailed description of the accompanying drawings which follows, the flow path of the pressurized air through the enclosure may be reversed without departing from the scope of the invention. Thus, the container of the present invention may also include a pair of return air plenums which extend from the air recirculation plenum along the length of the elongated enclosure parallel to the longitudinal axis and wherein each of the pair of return air plenums are defined by a corresponding one of the side walls and a plenum wall spaced from the corresponding side wall and extending from the upper margins of the enclosure such that the plenum wall is adapted to be coextensive and in abutting contact with a portion of the cargo load. In this case, the container includes a single air delivery plenum and a source of pressurized air. The source of pressurized air has an inlet in fluid communication with the exhaust air from the refrigeration system and an outlet in fluid communication with the air delivery plenum. Thus, the air delivery plenum is defined between the pair of return air plenums such that cool air is supplied under pressure along the longitudinal length of the enclosure, for example between spaced rows of the cargo load. The air then flows through the cargo load in a direction substantially transverse to the longitudinal axis into the pair of return air plenums. Thereafter, the air flows substantially parallel to the longitudinal axis and adjacent to corresponding side wall back to the air recirculation plenum.

In addition, the present invention is also directed toward a mobile ripening container adapted for transporting perishable goods having an air delivery plenum and a return air plenum. The air delivery plenum includes a pair of air supply housings extending along a substantial length of the elongated enclosure parallel to the longitudinal axis. Each of the air supply housings have an inlet with a first, larger volume in fluid communication with the return air plenum and an outlet having a second, smaller volume. A source of pressurized air is supported within each of the housings and is adapted to induct air at a relatively lower pressure from the return air plenum through the inlet in the housing to pressurize the air and to exhaust air at a relatively higher pressure such that the air flows through the cargo load in a direction substantially transverse to the longitudinal axis into the return air plenum and is ultimately inducted into the inlet of the air supply housing.

Thus, the present invention provides a container which is not only road-worthy, for example, being towable behind a semi-truck but is also adapted for piggyback use for railroad cars, and for container bodies contemplated for land and sea service. Another advantage of the container of the present invention is that it has a sufficient capacity to economically transport not only perishable but non-perishable goods as well. Further, another advantage of the present invention is that it can participate in a controlled ripening process of fruit and/or other produce in a cost-effective and commercially viable manner.

BRIEF DESCRIPTION OF THE DRAWINGS

Other advantages of the invention will be readily appreciated as the same becomes better understood by reference to the following detailed description when considered in connection with the accompanying drawings, wherein:

FIG. 3 is a partial cross-sectional side view of the container illustrated in FIG. 2;

FIG. 4 is a partial cross-sectional top view of the container illustrated in FIG.

FIG. 5 is a cross-sectional top view of the container illustrated in FIGS. 1 and 2;

FIG. 6 is a cross-sectional side view of the container illustrated in FIG. 5;

FIG. 7 is a perspective view of the forward corner portion of the enclosure of the container of the present invention featuring the air recirculation plenum, bulkhead, portions of the air delivery plenum and related structure and indicating air flow;

FIG. 9 is a partial cross-sectional side view illustrating the forward portions of the container illustrated in FIG. 8;

FIG. 10 is a cross-sectional end view of the container illustrated in FIG. 9;

FIG. 12 is a cross-sectional end view of the container illustrated in FIG. 11;

FIG. 13 is a perspective view of the air supply housing of the present invention;

DETAILED DESCRIPTION OF THE PREFERRED EMBODIMENT(S)

Figure 1:
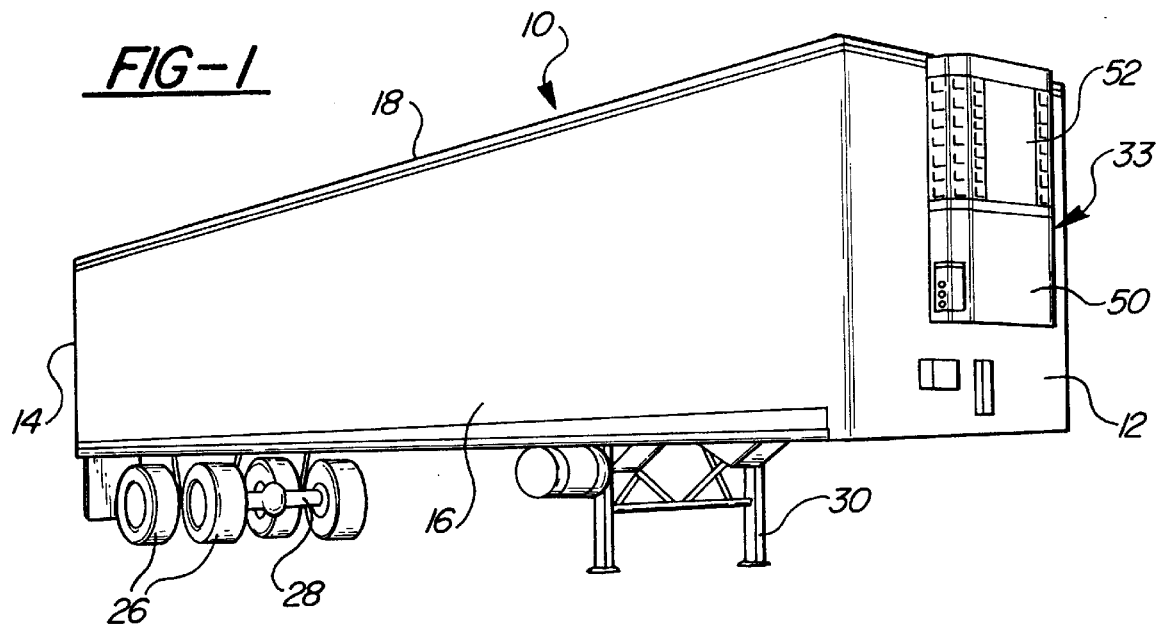
FIG. 1 is a perspective view of a mobile container of the present invention.
Figure 2:
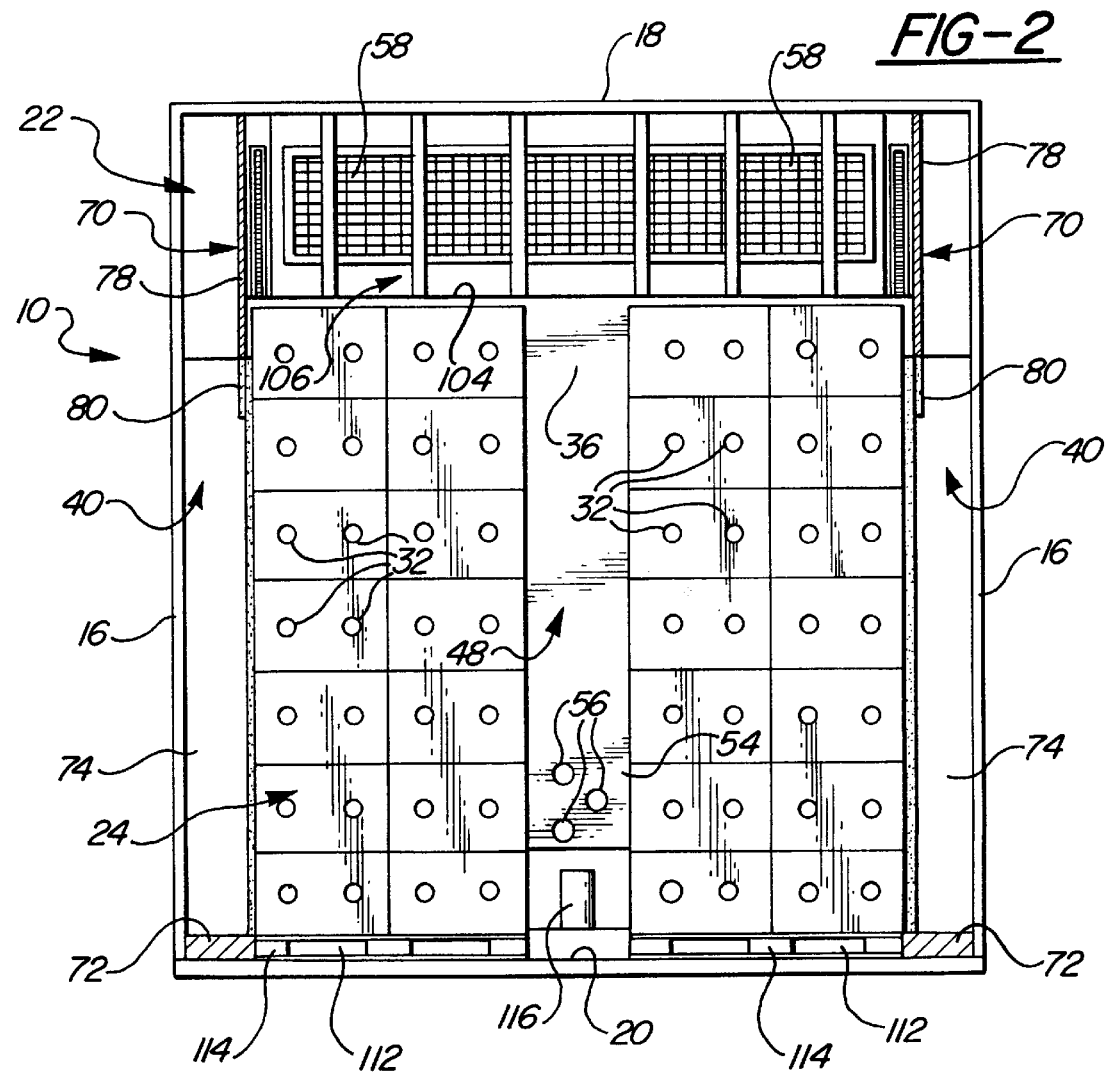
FIG. 2 is a cross-sectional end view of the container illustrated in FIG. 1.

The present invention overcomes the disadvantages in the related art in a mobile container, generally indicated at 10, 210, 310 and 410 in the figures, where like numbers are used to designate like structure throughout the drawings. These containers 10, 210, 310 and 310 are adapted for transporting perishable goods. Referring now specifically to FIGS. 1 through 3, the mobile container 10 includes a front wall 12, a rear wall 14 and a pair of side walls 16 extending therebetween. A ceiling 18 and a floor 20 are disposed spaced apart from one another by the front and rear walls 12, 14, respectively, as well as the pair of side walls 16 so as to define an elongated and generally rectangular enclosure 22. The enclosure 22 defines an imaginary longitudinal axis and is adapted to receive a cargo load, generally indicated at 24 in FIGS. 2 and 3. The container 10 illustrated in FIG. 1 is, on the exterior, a conventional trailer having a plurality of tires 26 interconnected via axles 28 as well as a retractable stand 30. Accordingly, the rear wall 14 may be formed by a retractable door or a pair of hinged doors (not shown). Further, the container 10 illustrated in these figures may be towed by a semi-truck for road transport. However, those having ordinary skill in the art will appreciate that the container of the present invention is not limited to such trailers and may encompass, by way of example only and not by way of limitation, trailers adapted for piggy-back use, railroad cars, and container bodies contemplated for land and sea service.

As best shown in FIG. 2, the cargo load 24 includes a plurality of palletized perishable goods. For the sake of this description only, and not by way of limitation, it will be assumed that the perishable goods in question are bananas. Thus, the cargo 24 illustrated here are banana boxes including bananas contained in plastic bags having holes therethrough (not shown). Each banana box includes air flow vents 32 which allow air to flow through the boxes as conventionally known in the art. The palletized boxes are stacked within the enclosure 22 in rows. As illustrated in the figures, there are four such rows extending along the length of the enclosure 22 but terminating short of the front wall 12 and short of the ceiling 18 as will be discussed in greater detail below. As illustrated in these figures, the cargo 24 is meant to represent approximately 20 pallets of conventionally stacked banana boxes. However, neither the exact number of pallets nor the exact cargo in the enclosure nor the perishable or non-perishable nature of the cargo form any part of the present invention. In addition while the cargo 24 represented in the figures is shown palletized, those having ordinary skill in the art will appreciate from the description that follows that the cargo need not be palletized.

As best shown in FIG. 4, the container 10 includes an air recirculation plenum, generally indicated at 34, which is defined in the enclosure 22 adjacent to the front wall 12. More specifically, the air recirculation plenum 34 is defined by a bulkhead 36 which is disposed spaced from the front wall 12 and which extends between the pair of side walls 16 transverse to the longitudinal axis. The bulkhead 36 may be made of any material suitable for forming a partition spaced from the front wall 12.

The container 10 further includes a refrigeration system, generally indicated at 38, which is in fluid communication with the air recirculation plenum 34. The refrigeration system 38 acts to induct air at a first temperature and to exhaust air at a second temperature. The refrigeration system 38 illustrated in the figures may be of the type commonly employed on refrigerated trailers. Often, the exhaust air from the system 38 will be cooler than the inducted air such that the refrigeration system 38 is employed to cool the air in the enclosure 22. However, those having ordinary skill in the art will appreciate that there are times when the air in the enclosure 22 may need to be warmed and so the air exhausted by the refrigeration system 38 may be warmer than the air inducted into the system. Thus, as used herein the term "refrigeration system" may also refer to a reversible heat pump which is capable of both cooling and warming the air.

A pair of air delivery plenums, generally indicated at 40 in FIGS. 2 through 6 extend generally from the air recirculation plenum 34 and specifically from the bulkhead 36 along the length of the elongated enclosure 22 substantially parallel to the longitudinal axis. A source of pressurized air, generally indicated at 42, has an inlet 44 in fluid communication with the exhausted air from the refrigeration system 38 and an outlet 46 in fluid communication with the pair of air delivery plenums 40. A return air plenum, generally indicated at 48, is defined between the pair of air delivery plenums 40. The return air plenum 48 acts to return the air which has been forced through the cargo load 24 under pressure back to the air recirculation plenum 34. The refrigeration system 38, air delivery plenums 40, source of pressurized air 42 and return air plenum 48 will each be described in greater detail below.

The refrigeration system may include an internal combustion engine (not shown) housed in a cabinet 50 exterior of the enclosure 22 as illustrated in FIGS. 1 and 3. The engine powers a compressor 52 housed above the engine. The refrigeration system 38 also includes an evaporator (typically referred to in the art as "cooling coils"). The evaporator is in fluid communication with the compressor 52 for cycling refrigerant through the system 38. The evaporator is supported in a housing 54. The housing 54 is located in the air recirculation plenum 34 as shown in FIGS. 2, 4 and 7. The housing 54 includes an inlet 56 for inducting a portion of the air in the recirculation plenum 34 and an outlet 58 directed toward the inlet 44 to the source of pressurized air 42. Refrigeration systems of this type found on refrigerated, road-worthy trailers may have ratings of up to 66,000 BTUs which is sufficient cooling power to handle a load of ripening bananas under certain, controlled conditions.

However, standard refrigerated trailers known in the art are not equipped with sufficient sources of pressurized air nor the structure necessary to deliver that air throughout the enclosure of the trailer to ensure uniform cooling, gassing and thus ripening of the fruit. The container of the present invention overcomes this serious disadvantage in the related art as will be described in greater detail below.

As best shown in FIG. 2, the inlet 56 to the evaporator housing 54 is located near the floor 20 and inducts only a portion of the air in the recirculation plenum 34. The remainder of the air in the recirculation plenum 34 is inducted directly into the inlet 44 to the source of pressurized air 42. In the past, the conventional wisdom would have rejected this configuration as insufficient to handle the heat generated by the bananas during the ripening process. Condensate from the evaporator is allowed to drip onto the floor 20 of the container 10 where, under certain conditions, it evaporates and is recirculated again through the cargo 24. This inhibits the dehydration of the produce.

The source of pressurized air 42 includes a plurality of fans 60 located at the front corners of the container 10 generally at the intersection of the front wall 12 and side walls 16. As best shown in FIGS. 3, 4 and 6, the fans 60 are disposed vertically along the height of the container 10 and have inlets 44 in fluid communication with the air recirculation plenum 34. The fans 60 also have outlets 46 in sealed, fluid communication with the pair of air delivery plenums 40. More specifically, the container 10 of the present invention employs a set of centrifugal fans 60 associated with each one of the pair of air delivery plenums 40. Each set of fans 60 include four centrifugal fans 60 and two motors 62. Each of the motors 62 operatively powers two of the centrifugal fans 60. In turn, the motors 62 may be powered by a separate generator or may be run off the internal combustion engine which powers the compressor. The inventors have found that ¾ Hp centrifugal fans rated at 3,500–3,700 scfm and manufactured by Dayton are sufficient to provide cool, pressurized air to the pair of air delivery plenums 40.

Each of the pair of cool air delivery plenums 40 is defined by a corresponding one of the pair of side walls 16 and a plenum wall, generally indicated at 70. The plenum wall 70 is disposed spaced from the corresponding side wall 16 and extends from the upper margin of the enclosure 22. As illustrated in FIGS. 2, 3, 6 and 7, the plenum walls 70 extend from the ceiling 18 downwardly for a predetermined extent but not for the entire height of the container 10. Further, each plenum wall 70 is specifically adapted to be coextensive and in abutting contact with an upper portion of the cargo load 24.

As best shown in FIGS. 2 and 7, a curb 72 extends for at least a portion of the length of the enclosure 22 adjacent each of the pair of side walls 16 and between the air recirculation plenum 34 and the rear wall 14 of the container 10. The curb 72 defines a width which substantially corresponds to the space 74 defined between the plenum wall 70 and the associated side walls 16. The curb 72 acts to space the cargo load 24 from the side walls 16 such that the plenum wall 70 is adapted to be coextensive and in abutting contact with a portion of the cargo load 24. Curb 72 may be formed in a number of ways including, but not limited to, employing a series of blocks spaced along the length of the enclosure 22, forming a rib or ribs along the length of the enclosure 22 spaced from the side wall using, for example, an angle iron, or defining a solid curb 72 using wood or other materials as illustrated in the figures.

Returning once again to the pair of air delivery plenums 40, as best shown in FIGS. 3 and 6, these plenums 40 have a volume which decreases in cross-sectional area over the length thereof and in a direction from the air recirculation plenum 34 toward the rear wall 14 of the container 10. This feature acts to limit the reduction in the velocity of the air flowing through the pair of air delivery plenums 40 over the longitudinal length of the enclosure 22 from the outlet 46 of the fans 60 toward the rear wall 14 and with the optimum goal of maintaining air flow velocity within the air delivery plenums 40. To this end, as shown in FIGS. 3 and 6, the air delivery plenums 40 include a sharp step down 76 which results in a reduced volume of the delivery plenums 40. However, those having ordinary skill in the art will appreciate that the cross-sectional area of the plenums 40 may be gradually decreased over the longitudinal length thereof or otherwise reduced so as to maintain the velocity, flow rate and pressure of the air in the plenums 40.

Referring now to FIGS. 2, 3 and 7, the plenum walls 70 are disposed substantially parallel to the associated side walls 16 and include a rigid portion 78 and a flexible portion 80. The flexible portion 80 extends vertically from the lower terminal edge 82 of the rigid portion 78 for a limited extent. The flexible portion 80 is specifically adapted to contact the cargo load 24 in sealing engagement under the positive pressure induced in the pair of air delivery plenums 40 by the fans 60. Thus, between the flexible portion 80 and the floor 20, the delivery plenums 40 are defined by the associated side walls 16 and the cargo 24 adjacent to the curb 72.

The bulkhead 36 includes a pair of lateral edges 84 which abut a portion of the pair of plenum walls 70 near the outlet 46 of the fans 60. Furthermore, the bulkheads 36 include a pair of flexible bulkhead gaskets 86 which are located adjacent to the lateral edges 84 and extend substantially vertically between the plenum wall 70 and the floor 20, or at least to the curb 72. These gaskets 86 flex into sealing contact with the cargo load 24 located at the lateral edges 84 of the bulkhead 36 under the influence of the pressurized air flowing to the cool air delivery plenum 40. In this way, pressurized air does not escape the delivery plenums 40 at this juncture.

Similarly, and as best shown in FIGS. 3 and 4, the air delivery plenums 40 include end seals, generally indicated at 90. The end seals 90 are disposed spaced from the air recirculation plenum 34 and extend for a substantial portion of the vertical extent of the air delivery plenums 40 and between the associated side wall 16 and the plenum wall 70 filling the space 74 therebetween to seal the distal ends of the air delivery plenums 40. More specifically, the end seals 90 include a first portion 92 which spans the space 74 between the associated side walls 16 and the plenum walls 70 and a flexible portion 94 which extends vertically between the plenum wall 70 and the floor 20, or at least to the extent of the curb 72. The flexible sealing portion 94 is capable of sealing contact with the cargo load 24. Importantly, the end seals 90 are adjustable in the longitudinal direction along the length of the pair of air delivery plenums 40 to limit the effective length of the air delivery plenums 40 so as to correspond with the longitudinal distance within the enclosure 22 which is occupied by the cargo load 24. Thus, in the case where partial deliveries are made, when a portion of the cargo is unloaded, the end seals 90 may be slidably moved or otherwise positioned to reduce the length of the cool air delivery plenums 40 so as to correspond to the length of the enclosure 22 which is occupied by the cargo load 24.

Referring now to FIGS. 4, 5, and 7, the bulkhead 36 includes an opening 100 providing fluid communication between the return air plenum 48 and the air recirculation plenum 34. The return air plenum 48 includes a central corridor 102. The central corridor 102 is defined between the pair of air delivery plenums 40 and extends substantially parallel to the longitudinal axis of the elongated enclosure 22. The central corridor 102 is in fluid communication with the air recirculation plenum 34 through the opening 100 in the bulkhead. As illustrated in the figures, the central corridor 102 is essentially defined or bounded by the cargo load 24 and extends substantially along the longitudinal axis of the enclosure 22. However, those having ordinary skill in the art will appreciate that the central corridor 102 could be defined anywhere between the pair of cool air delivery plenums 40 and is not limited to a location corresponding substantially to the longitudinal axis of the enclosure 22.

The bulkhead 36 extends from the floor 20 substantially vertically, but for an extent less than the height of the enclosure 22 to define a top edge 104. The top edge 104 is spaced from the ceiling 18. The return air plenum 48 also includes an upper duct 106 which is defined between the ceiling 18 and the tops 108 of the cargo load 24 as well as between the pair of air delivery plenums 40. The upper return duct 106 is thus in fluid communication with the air recirculation plenum 34 via the space between the top edge 104 of the bulkhead 36 and the ceiling 18. The return air plenum 48 may also include a lower return duct 112 which is formed through the pallets 114 above the floor 20 of the enclosure 22. In the absence of such pallets 114, and in the case of a container having slotted floors, the slots in the floor may also function as a lower return duct. In any event, like the upper return duct 106, the lower return duct 112 is in fluid communication with the air recirculation plenum 34.

The operation of the container 10 will now be described with reference to FIGS. 4 through 7. The refrigeration system 38 inducts return air found in the air recirculation plenum 34 into the housing 54 through the inlet 56 as indicated by the small arrows 120. However, only a relatively small amount of the air found in the air recirculation plenum 34 is actually inducted into the housing. At present, it is estimated that only a portion of the air is inducted into the housing 54 where it is cooled (or heated as the case may be) as it passes over the evaporator. Under certain conditions, moisture which has been picked up by the air as it passes over the produce will condense onto the cooling coils of the evaporator. This condensation is allowed to drip onto the floor 20 of the container 10 where some of its evaporates such that the air in the enclosure 22 is re-hydrated or humidified.

After cooling, the air flows through the outlet 58 in the housing 54 as indicated by the arrows 122. In the preferred embodiment, the cool air is directed toward the source of pressurized air 42 and inducted into the fans 60 through the inlet 44. At the same time, other recirculated air found in the air recirculation plenum 34 is also inducted through the inlet 44 into the centrifugal fan 60 as indicated by the larger arrows 124 (FIGS. 4 and 7). The fans 60 compress the air and deliver cool, pressurized air to the pair of air delivery plenums 40 via the outlets 46. This cool air is supplied along the longitudinal length of the enclosure 22 substantially parallel to the adjacent side walls 16 as indicated by the arrows 126. Thus, the air delivery plenums 40 are pressurized with cool air. The cool air is essentially forced through the vents 32 in the boxes, passes through the hands of the bananas (or other perishable goods) and then enters the return air plenum 48. More specifically, the flow of air through the cargo 24 is substantially transverse to the longitudinal axis of the enclosure 22. The air flows from the delivery plenums 40 into the return air plenum 48 over a relatively short distance (essentially the width of two rows of palletized banana boxes found on either side of the central corridor 102). Cool air is therefore able to absorb the heat generated during the exothermic ripening process. Warmer air enters the central corridor 102 as well as the upper return duct 106. In addition some air may also flow into a lower return duct 112, in the case where the cargo has been palletized or the floor 20 if the container is slotted to provide a flow passage along the length of the enclosure 22. The air then flows substantially parallel to the longitudinal axis of the enclosure 22 back to the air recirculation plenum 34 as indicated by the arrows 128. This process is continually repeated.

Those having ordinary skill in the art will appreciate that the flow path of the cooling air through the enclosure 22 could be easily reversed without departing from the scope of the invention. More specifically, those having ordinary skill in the art will appreciate that the container 10 could just as well include a pair of return air plenums 48 which extend from the air recirculation plenum 34 along the length of the elongated enclosure 22 parallel to the longitudinal axis and wherein each of the pair of return air plenums are defined by a corresponding one of the side walls 16 and a plenum wall 70 spaced from the corresponding side wall 16 and extending from the upper margins of the enclosure 22 such that the plenum wall 70 is adapted to be coextensive and in abutting contact with a portion of the cargo load.

On the other hand, the container would then include a single air delivery plenum 40 and a source of pressurized air. The source of pressurized air has an inlet in fluid communication with the exhausted air from the refrigeration system 38 and an outlet in fluid communication with the air delivery plenum. Preferably, the source of pressurized air includes a plurality of fans 60 having inlets 44 in fluid communication with the air recirculation plenum 34 and outlets 46 in sealed, fluid communication with the air delivery plenum. The plurality of fans 60 provide cool, pressurized air to the air delivery plenum. Thus, the air delivery plenum 40 would be defined between the pair of return air plenums 48 such that cool air is supplied under pressure along the longitudinal length of the enclosure, for example, between spaced rows of the cargo load. The air then flows through the cargo in a direction substantially transverse to the longitudinal axis into the pair of return air plenums 48. Thereafter, the air flows substantially parallel to the longitudinal axis and adjacent a corresponding side wall 16 back to the air recirculation plenum 34. As discussed above, the volume of the air delivery plenum 40 decreases in cross-sectional area over the length thereof in a direction from the air recirculation plenum 34 toward the rear wall 14 of the container so as to limit the reduction in the velocity in air flowing through the air delivery plenum 40 over the longitudinal length of the enclosure 22. Similarly, end seals may be employed spaced from the air recirculating plenum 34 and extending for a substantial portion of the vertical extent of the air delivery plenum 40 between the spaced rows of the cargo to seal the distal end of the air delivery plenum 40. As noted above, the end seals are adjustable in the longitudinal direction along the length of the air delivery plenum to limit the length thereof so as to correspond to the longitudinal distance within the enclosure 22 which is occupied by the cargo.

Appropriate thermostats and control systems (not shown) are used in conjunction with the fans 60 and the refrigeration system 38 in order to accurately control the temperature within the enclosure 22. The container 10 may also include an ethylene gas dispenser 116 which, as shown in FIG. 2, which may be located on the floor 20 within the air recirculation plenum 34 and adjacent the inlet 56 of the evaporator housing 54. Alternatively, the ethylene gas dispenser 116 may be positioned in any other suitable place such that the ripening fruit may be effectively treated.

The structure and position of the pair of air delivery plenums 40 in conjunction with the return air plenum 48 and the associated hardware described above facilitate certain important advantages which are provided by the container of the present invention. More specifically, and as noted above, the volume of the air delivery plenums 40 decrease over the length of the enclosure 22 which results in a limitation in the reduction of the velocity of the air flowing through these plenums over the longitudinal length of the enclosure 22. The plenums 40 thus remain sufficiently pressurized over the longitudinal length of the enclosure 22. In the preferred embodiment illustrated in these figures, a portion of the air delivery plenums 40 is defined by the cargo 24. The flexible portions 80 of the plenum walls 70 effect an air-tight seal against the upper margins of the cargo load under the positive pressure induced in the delivery plenums 40. In a similar way, the flexible bulkhead gaskets 86 seal against the cargo load located at the lateral edges 84 of the bulkhead 36 to eliminate any leaks in the air delivery plenums 40 at the lateral edges 84 of the bulkhead 86. In addition, the end seals 90, which provide the ability to change the effective length of the delivery plenums 40 to correspond with the longitudinal distance that the cargo 24 occupies in the enclosures are another, important feature of the present invention and facilitate the economic viability of the container 10 of the present invention.

Air flowing through both the cool air delivery plenums 40 and the return air plenum 48 in cubic feet per minute is balanced to the extent that the air flow is substantially equal therebetween. Importantly, this balance is achieved through the efficient use of the cargo space in the enclosure 22 which facilitates, not only maximum loads of palletized fruit such as bananas, but in addition, makes the container of the present invention suitable for economically transporting other perishable and non-perishable goods. To this end, the space 74 defined by each cool air delivery plenum 40 is approximately 3½ inches wide. The central corridor is approximately 6 to 7 inches wide when the cargo 24 is loaded in the enclosure 22 as indicated in FIG. 2. Obviously, the width of the air delivery plenums 40 and central corridor 102 have been exaggerated in the figures for illustrative purposes. Thus, the present invention provides a container which is road worthy, for example, being towable behind a semi-truck, and which can carry a sufficient quantity of perishable goods, such as bananas, can participate in a controlled ripening process of fruit in a cost-effective and commercially viable manner and which is also capable of economically handling other, perishable and non-perishable goods.

Figure 8:
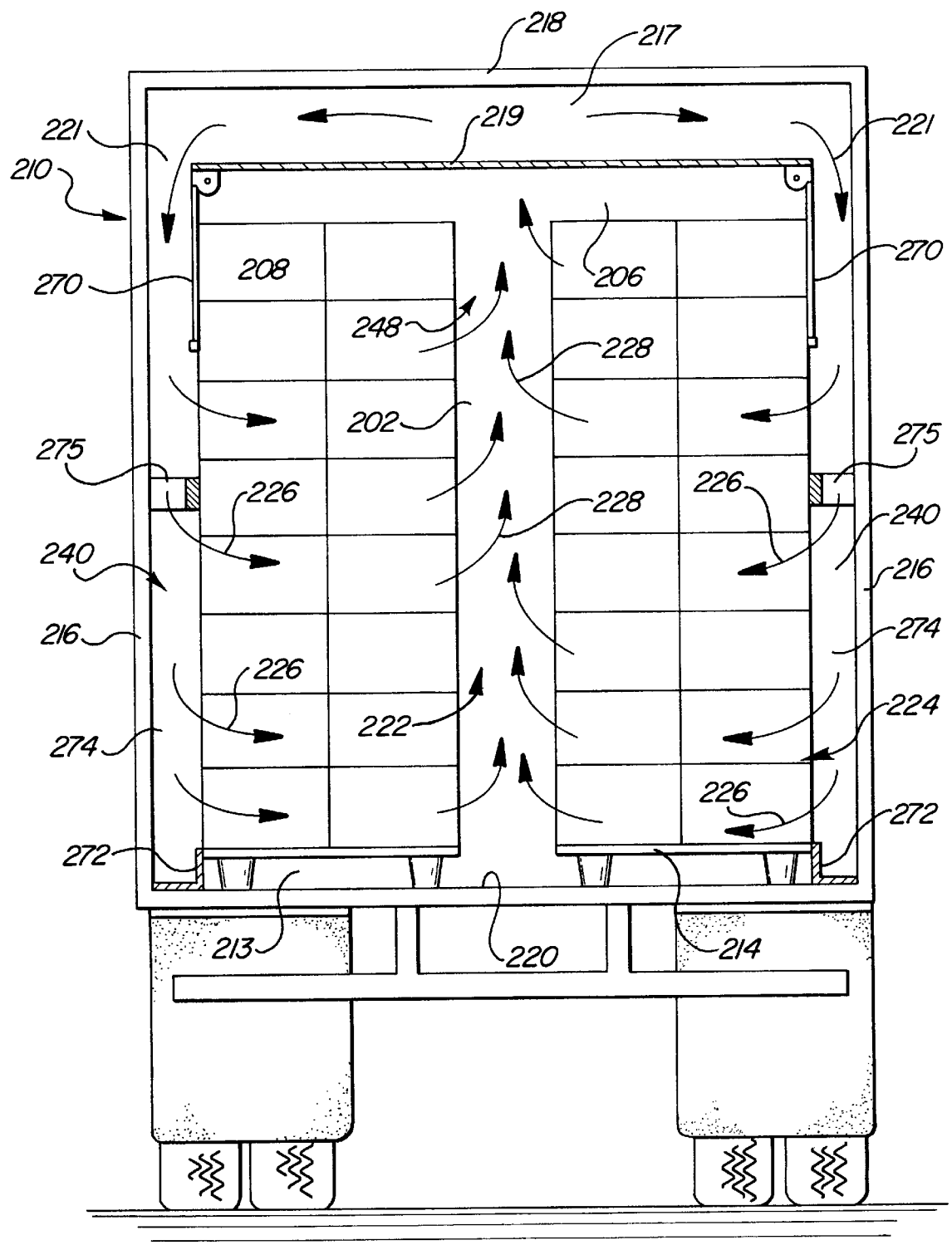
FIG. 8 is a cross-sectional end view of another embodiment of the container of the present invention.

An alternate embodiment of the container of the present invention is generally indicated at 210 in FIGS. 8–10 where like numerals are used to designate like structure. The container 210 is similar to the container 10 shown in FIGS. 1–7 and includes a front wall 212 and a rear wall (not shown), a pair of side walls 216 extending therebetween as well as a ceiling 218 and a floor 220. This structure defines an enclosure 222 which is adapted to receive cargo 224. In addition, and like the container 10, the container 210 also includes an air recirculation plenum, generally indicated at 234, which is defined in the enclosure 222 adjacent to the front wall 212. More specifically, the air recirculation plenum 234 is defined by the bulkhead 236 which is disposed spaced from the front wall 212 and which extends between the pair of side walls 216 transverse to the longitudinal axis of the enclosure 222.

The container 210 also includes a refrigeration system, schematically indicated at 238 in FIG. 9 which is fluid communication with the air recirculation plenum 234. The refrigeration system 238 acts to induct air at a first temperature and to exhaust at a second temperature.

Container 210 also includes a pair of air delivery plenums, generally indicated at 240 which extend generally from the air recirculation plenum 234 along the length of the elongated enclosure 222 parallel to the longitudinal axis. Each of the air delivery plenums 240 is defined by a corresponding one of the pair of side walls 216 and a plenum wall 270 which is disposed spaced from the corresponding side wall 216 and extends from the upper margins of the enclosure 222. The plenum walls 270 are adapted to be coextensive and in abutting contact with an upper portion of the cargo load 224. In essence, the plenum walls 270 are similar to the plenum walls 70 described above in connection with the container 10 and illustrated in FIGS. 1–7. In addition, the container 210 includes an upper air supply duct 217 formed by a partition 219 made of any suitable material and located spaced from, but substantially parallel to the ceiling 218 and between the plenum walls 270. The partition extends substantially for the length of the elongated enclosure 222. The pair of air delivery plenums 240 are open at their upper margin as indicated at 221 and are thus in fluid communication with the upper air supply duct 217.

The container 210 also includes a return air plenum 248 defined between the pair of air delivery plenums 240. More specifically, the return air plenum 248 includes a central corridor 202 defined between the two innermost palletized rows of boxes in the cargo load 224. In addition, the return air plenum 248 includes an upper return duct 206 which is defined between the tops 208 of the boxes, the vertical plenum walls 270 and the bottom of the top planar partition 219. The upper return duct 206 extends longitudinally within the enclosure 222 for a substantial portion of its length. The return air plenum 248 may also include a lower return duct 213 formed through the pallets 214 above the floor 220 of the enclosure 222. The central corridor 202, upper return duct 206, and lower return duct 213 all are in fluid communication with the air recirculation plenum 234 through the opening 200 in the bulkhead 23 (FIG. 10).

The container 210 has a source of pressurized air, generally indicated at 242 in FIGS. 9 and 10. This may include, for example, one or more centrifugal fans, schematically indicated at 260. The fan 260 has an outlet 246. The fan 260 is in fluid communication with the air supply duct 217 through the outlet 246. The outlet 246 to the fan 260 tapers from a first volume 245 to a second, smaller volume 247 which feeds the air supply duct 217 with high pressure air. Thus, the fan 260 provides pressurized air which flows along the pair of air delivery plenums 240 as well as the upper air supply duct 217 along the length of the enclosure 222, along the side walls 216, transversely through the cargo load 224 and back into the return air plenum 248 as indicated by the arrows 226, 228, respectively. The container 210 illustrated in FIGS. 8–10 also discloses the use of rub panels 275 positioned between the lower terminal edges of the plenum walls 270 and the curbs 272 and spanning the space 274 between the side walls 216 and the cargo in order to assist in stabilizing the cargo load 224. Further, the pair of curbs 272, illustrated in these figures consist of elongated pieces of angle iron.

Figure 11:
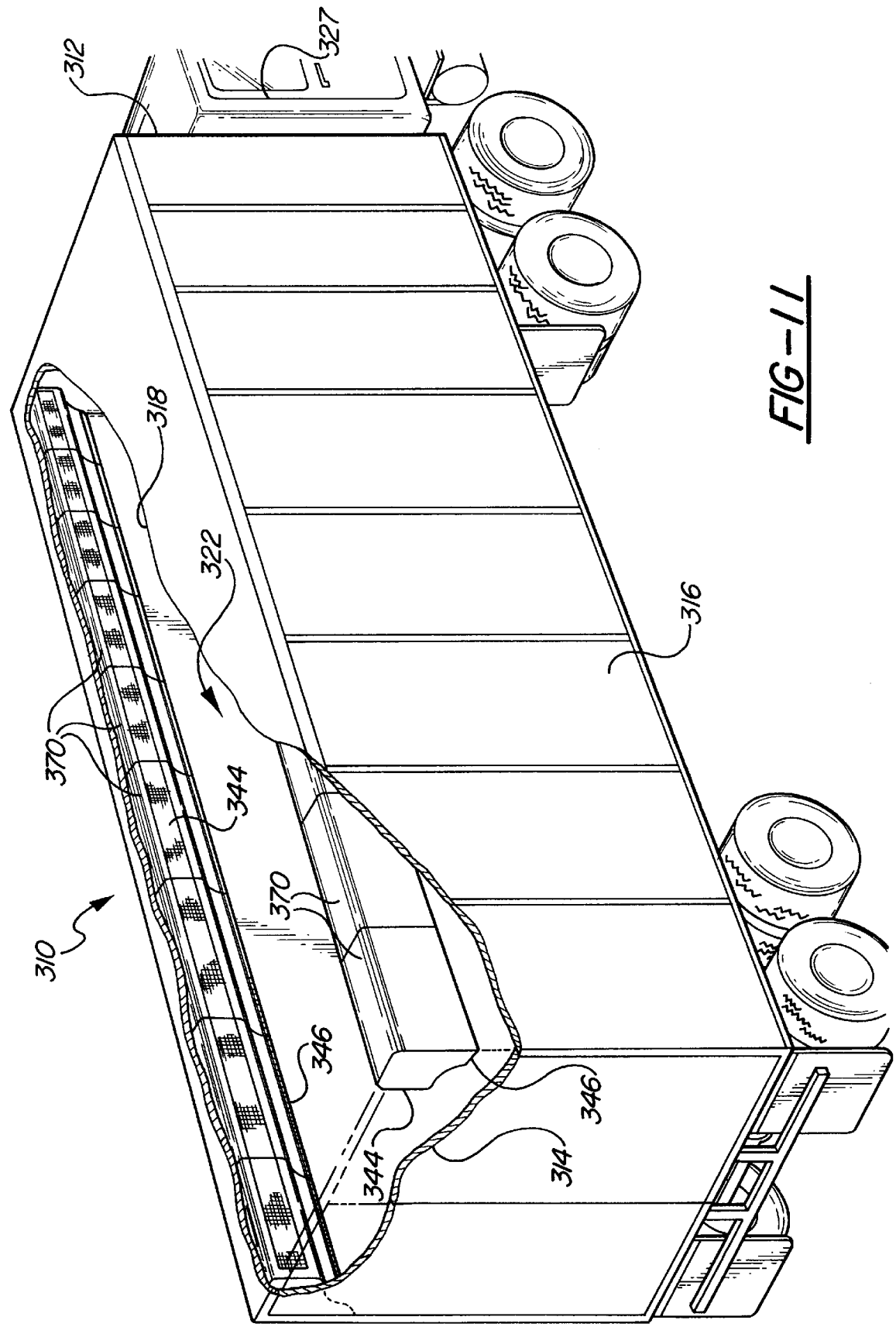
FIG. 11 is a perspective view having a partially broken away portion of a tractor trailer illustrating another embodiment of the mobile container of the present invention.

Another, alternate embodiment of the container of the present invention is generally indicated at 310 in FIGS. 11–12 where like numerals are used to designate like structure. The container 310 is similar to the containers 10 and 210 shown in FIGS. 1–10 and includes a front wall 312, a rear wall 314 and a pair of side walls 316 extending therebetween. A ceiling 318 and a floor 320 are disposed spaced apart from one another by the front and rear walls 312, 314, respectively, as well as a pair of side walls 316 so as to define an elongated and generally rectangular enclosure 322. The enclosure 322 defines an imaginary longitudinal axis and is adapted to receive a cargo load, generally indicated at 324 in FIG. 12. Like the container 10 illustrated in FIG. 1, the mobile container 310 is, on the exterior, a conventional, road-worthy trailer which is adapted to be towed by a semi-truck 327. In addition, it will be assumed that the palletized cargo load 324 consists of conventionally stacked banana boxes.

The container 310 includes an air delivery plenum, generally indicated at 340, and a return air plenum, generally indicated at 348. In the embodiment illustrated in FIGS. 11–13, the air delivery plenum 340 includes at least one, but preferably a pair of air supply housings 370 extending along a substantial length of the elongated enclosure 322 parallel to the longitudinal axis thereof. More specifically, the air delivery plenum 340 includes a plurality of discrete air supply housings 370 disposed side by side relative to each other along the longitudinal length of the enclosure 322 at the upper corners thereof. However, those having ordinary skill in the art will appreciate that each housing 370 may be formed by a single elongated structure. The air supply housings 370 may be manufactured from aluminum, sheet metal, plastic or any other suitable material. Each air supply housing 370 includes an inlet 344 and an outlet 346. The inlet 344 has a first, larger volume in fluid communication with the return air plenum 348. The outlet 346 has a second, smaller volume.

The return air plenum 348 is generally located between the air delivery plenum 340 and includes a central corridor 302 and an upper return duct 306. The central corridor 302 extends substantially parallel to the longitudinal axis of the elongated enclosure 322 and may be bounded on two sides by the cargo load 324. On the other hand, the upper return duct 306 is defined between the ceiling 318 and the tops 308 of the cargo load 324 as well as the air supply housings 370.

The container 310 also includes a source of pressurized air which is supported in each of the housings 370. More specifically, a plurality of centrifugal fans, schematically indicated at 360, are supported in the housings and are adapted to induct air at a relatively lower pressure from the return air plenum 348 through the inlets 344 of each housing 370. Furthermore, the fans 360 pressurize the air and exhaust the air through the outlet 346 at a relatively higher pressure. Like the containers disclosed above, the mobile container 310 also includes a refrigeration system having a compressor (not shown in these figures) and an evaporator 354 which is in fluid communication with the compressor for cycling refrigerant through the refrigeration system. As best shown in FIG. 12, at least a portion of the evaporator or "cooling coil" 354 is supported in the air supply housings 370. The fans 360 act to induct return air through the inlet 344 and past the evaporators 354 which cools the return air. The fans 360 further act to pressurize the cool and exhaust it as indicated above.

As indicated by the arrows 326 in FIG. 12, the air supply housings 370 are positioned to exhaust the air in a substantially vertical direction between the pair of side walls 316 and the return air plenum 348. More specifically the air flows in the space 374 located between the side walls 316 and the cargo 324 from the outlet 346 of the housing 370 substantially to the floor 320 of the enclosure 322. The cooled air then flows substantially transverse to the longitudinal axis of the enclosure 322 through the cargo load 324 and into the central corridor 302 and upper return duct 306 of the return air plenum 348 as indicated by the arrows 328. The air is ultimately inducted back into the inlets 344 of the opposed air supply housings 370. As illustrated in FIG. 12, the outlet 346 of the air supply housings 370 extend so as to be coextensive with the upper margins of the cargo 324. In addition, vertically extending seals (not shown) may be suspended from the lower edges of the air supply housing 370 to the extent that they contact the upper margins of the cargo 324 so as to seal the space 374 between the side walls 316 and cargo 324 along the longitudinal length of the enclosure 322 adjacent the side walls 316.

Figure 14:
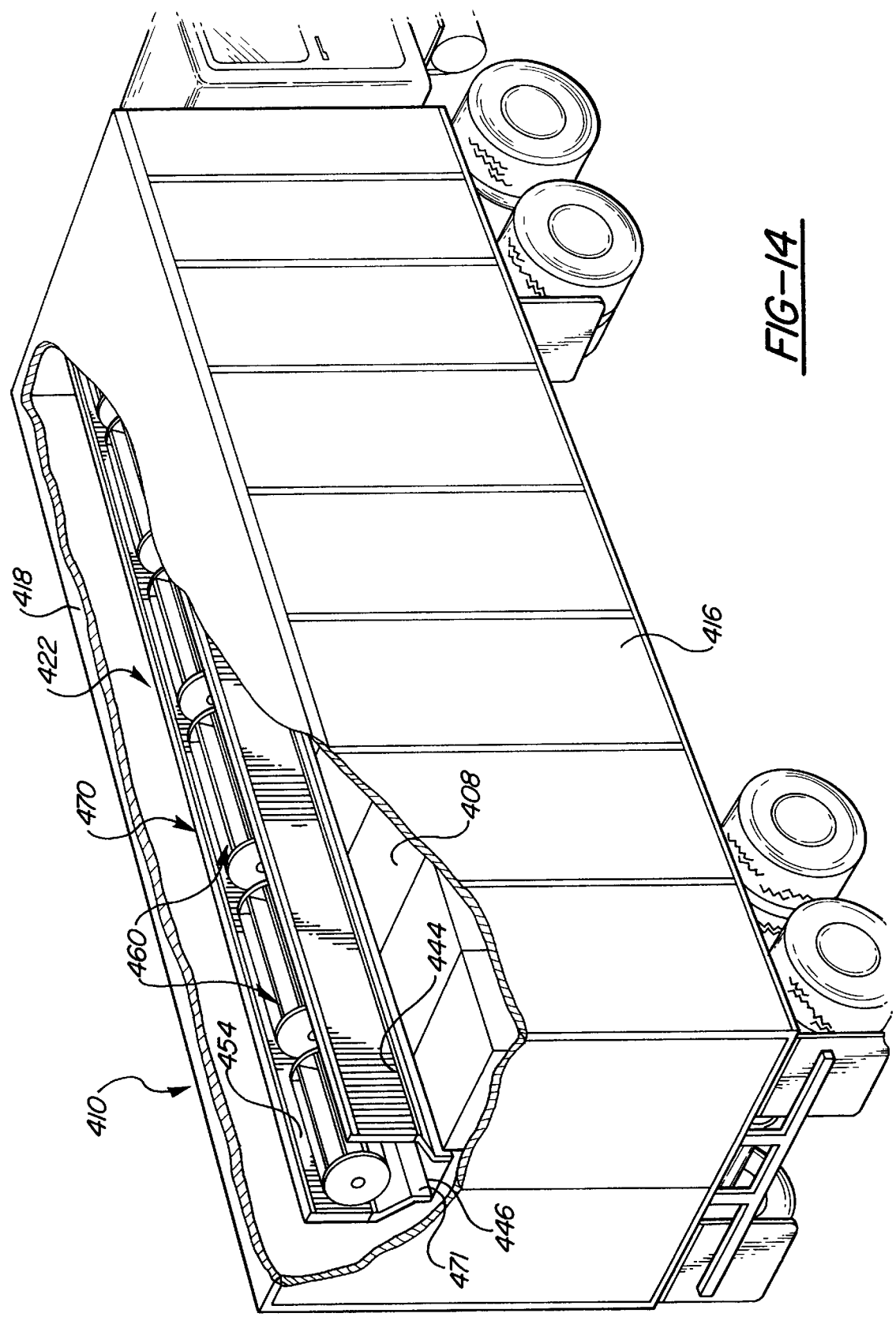
FIG. 14 is a perspective view having a partially broken away portion of a tractor trailer illustrating another embodiment of the mobile container of the present invention.
Figure 15:
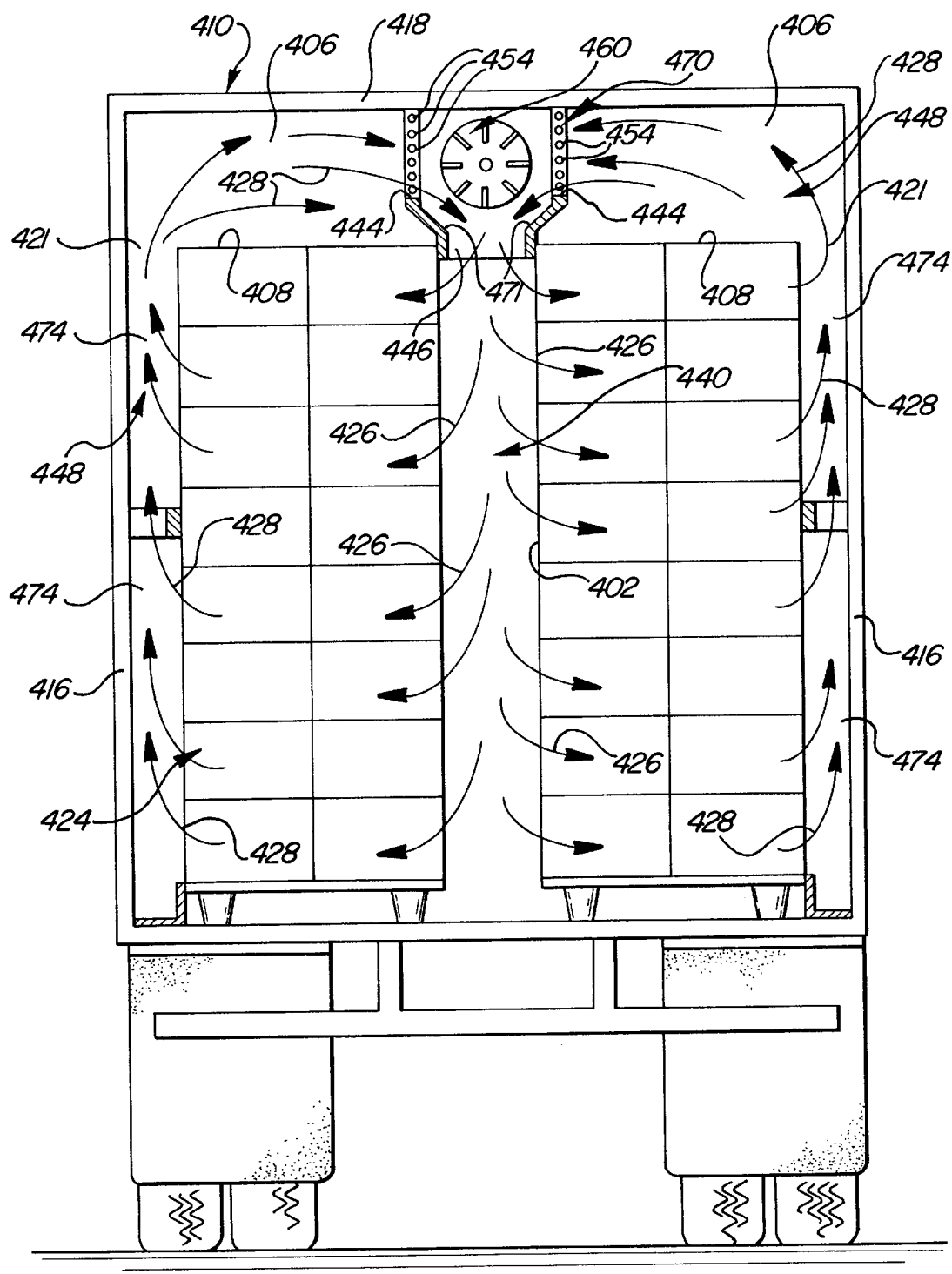
FIG. 15 is a cross-sectional end view of the container illustrated in FIG. 4.

Still another, alternative embodiment of the present invention is generally indicated at 410 in FIGS. 14 and 15 where like numerals are used to designate like structure. There, the mobile container 410 employs an air delivery plenum, generally indicated at 440, and a return air plenum, generally indicated at 448. In this embodiment, the direction of the air flow has been reversed when compared with the container shown in FIGS. 11–12. To this end, the air delivery plenum 440 includes an air supply housing 470 extending longitudinally for a substantial portion of the length of the enclosure 422 and suspended from the ceiling 418 roughly equidistant from the opposed side walls 416 and above the central corridor 402. Like the air supply housings described above, the housings 470 may be manufactured from aluminum, sheet metal, plastic or any other suitable material.

The air supply housing 470 includes a pair of laterally spaced inlets 444 extending substantially along the longitudinal length of the enclosure 422. These inlets 444 have a first, larger diameter in fluid communication with the return air plenum 448. The housings 470 also have a single longitudinal outlet 446 in fluid communication with the central corridor 402. A plurality of centrifugal fans, schematically indicated at 460, are supported within the housing 470 and provide a source of pressurized air for the enclosure 422. The outlet 446 of the housing 470 is in fluid communication with a central corridor 402 which forms a portion of the air delivery plenum 440. The outlet 446 is formed by tapered side walls 471 of the housing 470 which narrow the air flow thereby increasing the air pressure in the central corridor 402. Importantly, the tapered side walls 471 are shaped so as to smoothly transition between the larger, first volume of the inlet 444 to the housing 470 to the smaller, second volume of the outlet 446 so as to reduce and substantially eliminate noise due to vibration created as the air impacts the side walls 471. In addition, vertically extending seals (not shown) may be suspended from the opposed lower edges near the outlet 446 of the housings 470 to an extent that they contact the upper margins of the cargo load 424.

Conversely, the return air plenum 448 is defined between the pair of side walls 416 and the associated cargo load 424. The return air plenum 448 includes side chambers 474 defined between the side walls 416 and the associated cargo 424. The return air plenum 448 also includes upper return ducts 406 defined between the side walls 416, the opposed inlets 444 of the housing 470, the tops 408 of the cargo 424 and the ceiling 418. Portions of the evaporator or cooling coils 454 are supported adjacent the inlets 444 of the air supply housing 470 for cooling return air. The exhausted air flows through the cargo load in a direction substantially transverse to the longitudinal axis of the enclosure 422 but in a direction opposite to that disclosed in FIGS. 11–12.

Referring now particularly to FIG. 15, the fans 460 induct air from the upper return duct 406 through the opposed inlets 444 of the housing 470 and past the cooling coils 454. The fans 460 then pressurize the air in the air supply housing 470. Pressurized air flows past the cooling coils 454 through the outlet 446 and into the central corridor 402. The air is then moved laterally outward through the air flow vents in the palletized banana boxes as shown by arrows 426 in FIG. 15. The air flow passes laterally outward through the banana boxes and into the side chambers 474 which are open at their upper margins 421. The air is then drawn up into the upper return duct 406 through the inlets 444 of the housing 470 as indicated by the arrows 428 and the process is continually repeated.

In addition, and like the embodiments shown in FIGS. 1–10, the containers illustrated in FIGS. 12 and 14–15 may include appropriate thermostats and control systems (not shown) which are used in conjunction with the fans 360, 460 and refrigeration systems in order to accurately control the temperature within the enclosures 322, 422.

Further, and like the containers discussed before, one important feature of the alternate embodiments of the present invention is that the air flowing through both the air delivery plenums and return air plenums in cubic feet per minute is balanced to the extent that the air flow is substantially equal. The use of the longitudinally extending cooling coils 354, 454 in conjunction with the pressurized air provided through the air supply housing 370, 470 in the containers 310 and 410 illustrated in FIGS. 11–15 provides sufficient cooling capacity such that these containers may be used as pre-coolers for quickly cooling produce, typically shortly after it has been harvested. Alternatively, and where pre-cooling is not required, these containers also provide sufficient cooling capacity to adequately control climacteric fruit during its exothermic ripening process. Still further, and due to the efficient use of the enclosures 322, 422, the containers 310 and 410 of the present invention are also suitable in size and capacity for shipping goods other than ripening fruit. In this way, the containers of the present invention may also be effectively employed during back hauls.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

We claim:

1. A mobile container adapted for transporting perishable goods, said container comprising:

a front wall, a rear wall, a pair of side walls extending therebetween, a ceiling and a floor disposed spaced apart from one another by said front, rear and pair of side walls so as to define an elongated enclosure having a longitudinal axis and adapted to receive a cargo load;

an air recirculation plenum defined in said enclosure adjacent said front wall;

a refrigeration system in fluid communication with said air recirculation plenum and adapted to induct air at a first temperature and to exhaust air at a second temperature;

a pair of air delivery plenums extending from said air recirculation plenum along the length of said elongated enclosure parallel to said longitudinal axis, each of said pair of air delivery plenums defined by a corresponding one of said pair of side walls and a plenum wall disposed spaced from said corresponding side wall and extending from the upper margins of said enclosure such that said plenum wall is adapted to be co-extensive and in abutting contact with a portion of the cargo load;

a source of pressurized air having an inlet in fluid communication with the exhausted air from said refrigeration system and an outlet in fluid communication with said pair of air delivery plenums; and a return air plenum defined between said pair of air delivery plenums such that cool air is supplied under pressure along the longitudinal length of said enclosure parallel to and adjacent said pair of side walls and then flows through the cargo load in a direction substantially transverse to said longitudinal axis into said return plenum whereafter the air flows substantially parallel to said longitudinal axis back to said air recirculation plenum.

2. A mobile container as set forth in claim 1 wherein each of said pair of air delivery plenums has a volume which decreases in cross-sectional area over the length thereof in the direction from said air recirculation plenum toward said rear wall of said container so as to limit the reduction in the velocity of the air flowing through said pair of air delivery plenums over the longitudinal length of said enclosure.

3. A mobile container as set forth in claim 1 wherein each of said plenum walls are disposed substantially parallel to said associated side wall and includes a rigid portion and a flexible portion, said flexible portion extending vertically from the lower, terminal edge of said rigid portion for a limited extent and adapted to contact the cargo load in scaling engagement under the positive pressure induced in said pair of air delivery plenums.

4. A mobile container as set forth in claim 1 including a bulkhead disposed spaced from said front wall and extending between said pair of side walls transverse to said longitudinal axis so as to define said air recirculation plenum, said bulkhead including a pair of lateral edges which abut a portion of said pair of plenum walls and a pair of flexible bulkhead gaskets attached to said lateral edges and extending vertically between said plenum wall and said floor, said gasket flexing into sealing contact with the cargo load located at said lateral edges of said bulkhead under the influence of pressurized air flowing through said pair of cool air delivery plenums.

5. A mobile container as set forth in claim 1 wherein said pair of air delivery plenums include end seals disposed spaced from said air recirculation plenum and extending for a substantial portion of the vertical extent of said pair of air delivery plenums and between said associated side wall and said plenum wall to seal the distal ends of air delivery plenums, said end seals being adjustable in the longitudinal direction along the length of said pair of air delivery plenums to limit the length of said air delivery plenums so as to correspond with the longitudinal distance within said enclosure which is occupied by the cargo load.

6. A mobile container as set forth in claim 5 wherein said end seals include a first portion which span the space between said associated side wall and said plenum wall and a flexible scaling portion which extends vertically between said plenum wall and said floor, said flexible sealing portion being capable of sealing contact with the cargo load.

7. A mobile container as set forth in claim 1 further including a curb extending for at least a portion of the length of said enclosure adjacent each of said pair of side walls between said air recirculation plenum and said rear wall and having a width substantially corresponding to the space defined between said plenum wall and said associated side wall, said curb acting to space the cargo load from said side wall such that said plenum wall is adapted to be co-extensive and in abutting contact with a portion of the cargo load.

8. A mobile container as set forth in claim 1 including a bulkhead disposed spaced from said front wall and extending between said pair of side walls transverse to said longitudinal axis so as to define said air recirculation plenum, said bulkhead including an opening providing fluid communication between said return plenum and said air recirculation plenum.

9. A mobile container as set forth in claim 8 wherein said return air plenum includes a central corridor defined between said pair of air delivery plenums and extending substantially parallel to said longitudinal axis of said elongated enclosure, said central corridor being in fluid communication with said air recirculation plenum through said opening in said bulkhead.

10. A mobile container as set forth in claim 1 including a bulkhead disposed spaced from said front wall and extending between said pair of side walls transverse to said longitudinal axis so as to define said air recirculation plenum, said bulkhead extending from said floor substantially vertically but for an extent less than the height of said enclosure to define a top edge spaced from said ceiling.

11. A mobile container as set forth in claim 10 wherein said return air plenum includes an upper return duct defined between said ceiling and the top of the cargo load and between said pair of air delivery plenums, said upper return duct being in fluid communication with said air recirculation plenum via the space between said top edge of said bulkhead and said ceiling.

12. A mobile container as set forth in claim 1 wherein said source of pressurized air includes a plurality of fans having inlets in fluid communication with said air recirculation plenum and having outlets in sealed, fluid communication with said pair of air delivery plenums, said plurality of fans providing cool, pressurized air to said pair of air delivery plenums.

13. A mobile container as set forth in claim 12 wherein said plurality of fans include a set of centrifugal fans associated with each one of said pair of air delivery plenums.

14. A mobile container as set forth in claim 13 wherein each of said set of fans includes four centrifugal fans and two motors, each of said motors operatively powering two of said centrifugal fans.

15. A mobile container as set forth in claim 1 wherein said refrigeration system includes a compressor and an evaporator in fluid communication with said compressor for cycling refrigerant through said system, said evaporator being supported in a housing, said housing located in said air recirculation plenum and having an inlet for inducting a portion of the air in the recirculation plenum and an outlet directed toward said inlet to said source of pressurized air.

16. A mobile container as set forth in claim 1 including an upper air supply duct formed by a partition located spaced from, but substantially parallel to, said ceiling and between said plenum walls, said partition extending substantially for the length of said elongated enclosure with said pair of air delivery plenums being in fluid communication with said upper air supply duct at the upper margins of said air delivery plenums, said outlet of said source of pressurized air being in fluid communication with said upper air supply duct.

17. A mobile container adapted for transporting perishable goods, said container comprising:

a front wall, a rear wall, a pair of side walls extending therebetween, a ceiling and a floor disposed spaced apart from one another by said front, rear and pair of side walls so as to define an elongated enclosure having a longitudinal axis and adapted to receive a cargo load;

an air recirculation plenum defined in said enclosure adjacent said front wall;

a refrigeration system in fluid communication with said air recirculation plenum and adapted to induct air at a first temperature and to exhaust air at a second temperature;

a pair of return air plenums extending from said air recirculation plenum along the length of said elongated enclosure substantially parallel to said longitudinal axis, each of said pair of return air plenums defined by a corresponding one of said side walls and a plenum wall spaced from said corresponding side wall and extending from the upper margins of the enclosure such that said plenum wall is adapted to be coextensive and in abutting contact with a portion of the cargo load;

an air delivery plenum and a source of pressurized air, said source of pressurized air having an inlet in fluid communication with the exhausted air from said refrigeration system and an outlet in fluid communication with said air delivery plenum, said air delivery plenum defined between said pair of return air plenums such that cool air is supplied under pressure along the longitudinal length of said enclosure and then flows through the cargo load in a direction substantially transverse to said longitudinal axis into said pair of return air plenums whereafter the air flows substantially parallel to said longitudinal axis adjacent a corresponding side wall and back to said air recirculation plenum.

18. A mobile container as set forth in claim 17 wherein said air delivery plenum has a volume which decreases in cross-sectional area over the length thereof in the direction from said air recirculation plenum toward said rear wall of said container so as to limit the reduction in the velocity in the air flowing through said air delivery plenum along the longitudinal length of said enclosure.

19. A mobile container as set forth in claim 17 wherein said air delivery plenum includes an end seal disposed spaced from said air recirculation plenum and extending for a substantial portion of the vertical extent of said air delivery plenum and between associated columns of the cargo to seal the distal end of said air delivery plenum, said end seal being adjustable in the longitudinal direction along the length of said air delivery plenum to limit the length thereof so as to correspond with the longitudinal distance within said enclosure which is occupied by the cargo load.

20. A mobile container as set forth in claim 17 wherein said source of pressurized air includes a plurality of fans having inlets in fluid communication with said air recirculation plenum and having outlets in sealed, fluid communication with said air delivery plenum, said plurality of fans providing cool, pressurized air to said air delivery plenum.

21. A mobile container adapted for transporting perishable goods, said container comprising:

a front wall, a rear wall, a pair of side walls extending therebetween, a ceiling and a floor disposed spaced apart from one another by said front, rear and pair of side walls so as to define an elongated enclosure having a longitudinal axis and adapted to receive a cargo load within said enclosure;

an air delivery plenum and a return air plenum, said air delivery plenum including at least one air supply housing extending along a substantial length of said elongated enclosure parallel to said longitudinal axis said at least one air supply housing having at least one inlet with a first, larger volume in fluid communication with said return air plenum and an outlet having a second, smaller volume; and a source of pressurized air supported within said housing and adapted to induct air at a relatively lower pressure from said return air plenum through said inlet of said housing, to pressurize the air and to exhaust air at a relatively higher pressure through said outlet in said housing such that the air flows through the cargo load in a direction substantially transverse to said longitudinal axis into said return air plenum and is ultimately inducted into said inlet of said air supply housing.

22. A mobile container as set forth in claim 21 further including a pair of air supply housings extending along a substantial length of said elongated enclosure parallel to said longitudinal axis, each of said air supply housings having an inlet with a first, larger volume in fluid communication with said return air plenum and an outlet having a second, smaller volume.

23. A mobile container as set forth in claim 22 wherein said outlet in said pair of air supply housings is positioned to exhaust air in a substantially vertical direction adjacent to said pair of side walls, said return air plenum defined between said pair of air supply housings such that return air flow substantially transverse to said longitudinal axis through the cargo load and said return air plenum back to said inlet to said air supply housing.

24. A mobile container as set forth in claim 22 wherein said pair of air supply housings are positioned to exhaust air in a substantially vertical direction between said pair of side walls and said return air plenum such that return air flows substantially transverse to said longitudinal axis through the cargo load and said return air plenum back to said inlet in said pair of air supply housings.

25. A mobile container as set forth in claim 22 further including a refrigeration system having a compressor and an evaporator in fluid communication with said compressor for cycling refrigerant through said system, at least a portion of said evaporator being supported in said pair of air supply housings for cooling return air inducted through said inlet in said housings.

26. A mobile container as set forth in claim 25 wherein said source of pressurized air includes a plurality of fans supported in said pair of air supply housings for inducting return air through said inlet in said housing, past said evaporators, pressurizing the cool air and exhausting the pressurized air through said outlets in said pair of air supply housings.

27. A mobile container as set forth in claim 26 wherein said fans include centrifugal fans supported in said pair of air supply housings.

28. A mobile container as set forth in claim 21 wherein said at least one air supply housing extends along a substantial length of said elongated enclosure and approximately equidistant from said opposed side walls.

\* \* \* \* \*

UNITED STATES PATENT AND TRADEMARK OFFICE
CERTIFICATE OF CORRECTION

PATENT NO. : 6,012,384
DATED : January 11, 2000
INVENTOR(S) : Mark A. Badalament, et. al.

It is certified that error appears in the above-identified patent and that said Letters Patent is hereby corrected as shown below:

Column 2, line 37, delete "Generally" and insert therefor --generally--.
Column 5, line 12, after "example" insert --,--.
Column 5, line 61, after "FIG." insert --3--.
Column 7, line 5, after "addition" insert --,--.
Column 11, line 5, after "addition" insert --,--.
Column 17, line 32 (Claim 3), delete "scaling" and insert therefor --sealing--.
Column 17, line 60 (Claim 6, delete "scaling" and insert therefor --sealing--.

Title page, item [56] under References Cited the following references should be identified as following:

| | | | | |
|---|---|---|---|---|
| 3,620,765 | 11/16/1971 | McDonnell | 99 | 103 |
| 3,862,649 | 01/28/1975 | Fernandes | 62 | 419 |
| 4,474,020 | 10/02/1984 | Freeman | 62 | 89 |
| 4,481,870 | 11/13/1984 | Smith | 98 | 6 |
| 4,532,774 | 08/06/1985 | Burns | 62 | 239 |
| 4,598,555 | 07/08/1986 | Windecker | 62 | 91 |
| 4,779,524 | 10/25/1988 | Wade | 99 | 476 |
| 4,934,255 | 01/19/1990 | McDonnell et al. | 98 | 6 |
| 4,979,431 | 12/25/1990 | Fujimoto et al. | 98 | 6 |
| 5,028,443 | 07/02/1991 | Wade | 426 | 312 |
| 5,101,643 | 04/07/1992 | Hicke | 62 | 407 |

UNITED STATES PATENT AND TRADEMARK OFFICE
CERTIFICATE OF CORRECTION

PATENT NO. : 6,012,384
DATED : January 11, 2000
INVENTOR(S) : Mark A. Badalament, et. al.

Page 2 of 3

It is certified that error appears in the above-identified patent and that said Letters Patent is hereby corrected as shown below:

| 5,316,178 | 05/31/1994 | Garber, Jr.      | 222 | 3   |
|-----------|------------|------------------|-----|-----|
| 5,319,941 | 07/14/1994 | Schilling        | 62  | 89  |
| 5,333,394 | 08/02/1994 | Herdeman et al.  | 34  | 467 |
| 5,373,780 | 12/20/1994 | Bianco           | 99  | 475 |
| 5,419,153 | 05/30/1995 | Hartley          | 62  | 408 |
| 5,438,917 | 08/08/1995 | Bolkenstein et al. | 99 | 476 |
| 5,460,841 | 10/24/1995 | Herdeman         | 426 | 263 |
| 5,475,926 | 12/19/1995 | Bolkenstein et al. | 34 | 200 |
| 5,497,698 | 02/12/1996 | Bolkenstein      | 99  | 476 |
| 5,516,539 | 05/14/1996 | Walsh et al.     | 426 | 231 |
| 5,531,158 | 07/02/1996 | Perryman Jr.     | 99  | 476 |

UNITED STATES PATENT AND TRADEMARK OFFICE
CERTIFICATE OF CORRECTION

PATENT NO.    : 6,012,384
DATED         : January 11, 2000
INVENTOR(S)   : Mark A. Badalament, et. al.

It is certified that error appears in the above-identified patent and that said Letters Patent is hereby corrected as shown below:

| | | | | |
|---|---|---|---|---|
| 5,566,608 | 10/22/1996 | Vejdani et al. | 99 | 475 |
| 5,658,607 | 08/19/1997 | Herdeman | 426 | 263 |
| 5,671,609 | 09/30/1997 | Lionetti | 62 | 407 |
| 5,706,662 | 01/13/1998 | Van | 62 | 89 |
| 5,778,557 | 07/14/1998 | Leavens | 34 | 222 |
| 5,799,495 | 09/01/1998 | Gast, Jr. et al. | 62 | 78 |

Signed and Sealed this

Sixth Day of February, 2001

Q. TODD DICKINSON

*Attest:*

*Attesting Officer*    *Director of Patents and Trademarks*